US012792762B1

(12) United States Patent
Schneider

(10) Patent No.: US 12,792,762 B1
(45) Date of Patent: Nov. 10, 2026

(54) SYSTEM, METHOD, PRODUCT, AND DEVICE FOR HARDWARE SEQUESTRATION AND ATOMIC STATE-MODIFICATION OF DISCRETE-STATE DATA OBJECTS

(71) Applicant: Eric Schneider, Hallandale Beach, FL (US)

(72) Inventor: Eric Schneider, Hallandale Beach, FL (US)

( * ) Notice: Subject to any disclaimer, the term of this patent is extended or adjusted under 35 U.S.C. 154(b) by 0 days.

(21) Appl. No.: 19/558,312

(22) Filed: Mar. 5, 2026

(51) Int. Cl.
*G06F 21/62* (2013.01)

(52) U.S. Cl.
CPC ................................ *G06F 21/6218* (2013.01)

(58) Field of Classification Search
CPC ............ G06F 21/6209; G06F 21/6218; G06F 21/6227; G06F 21/6236; G06F 21/6281; G06F 21/629; G06F 21/645; G06F 21/70; G06F 21/71; G06F 21/72
See application file for complete search history.

(56) References Cited

U.S. PATENT DOCUMENTS

| | | | |
|---|---|---|---|
| 10,366,378 | B1 | 7/2019 | Han et al. |
| 10,680,812 | B2 | 6/2020 | Hayton et al. |
| 10,931,652 | B2 | 2/2021 | Costa |
| 11,151,549 | B2 | 10/2021 | Ehrlich-Quinn |
| 11,244,309 | B2 | 2/2022 | Bentov et al. |

(Continued)

FOREIGN PATENT DOCUMENTS

| | | | | | |
|---|---|---|---|---|---|
| CN | 110998581 | A * | 4/2020 | ............. | G06F 21/72 |
| EP | 4657295 | A1 * | 12/2025 | ............. | H04L 63/20 |
| WO | WO-2023052077 | A1 * | 4/2023 | ........... | H04L 9/0894 |

OTHER PUBLICATIONS

Eric Schneider; "System, Method, Product, and Apparatus for Autonomous Transaction Initiation via Unprompted Machine-Readable Signals"; Unpublished U.S. Appl. No. 19/553,185, filed Feb. 27, 2026.

(Continued)

*Primary Examiner* — Kostas J Katsikis

(57) ABSTRACT

A system and device manage a hardware-sequestered machine-state using a hardware-protected execution environment (HPEE) comprising a local non-volatile ledger. The device executes atomic state-modifications, transitioning discrete-state data-objects between executable and non-executable states while generating self-verifying attestation records and hardware-bound nullifiers to authorize state updates across external centralized or distributed ledgers. The architecture supports secure state-transfer by verifying hardware-root-of-trust and integrity-states before ingesting data-objects, utilizing provisioning-payloads and temporary state-locks to synchronize authoritative data stores with the sequestered hardware state. Additionally, the HPEE facilitates complex transactions by generating multi-party attestation records triggered by dual-cryptographic handshakes. This framework ensures that a physical hardware unit remains the primary authoritative source for sequestered states, providing cryptographically verifiable proof of sequestration and enabling asynchronous, immutable synchronization between disparate network nodes and legacy infrastructures.

28 Claims, 14 Drawing Sheets

(56) References Cited

U.S. PATENT DOCUMENTS

| | | | |
|---|---|---|---|
| 11,769,154 B1 | 9/2023 | Cash et al. | |
| 11,893,509 B2 | 2/2024 | Donoho et al. | |
| 11,924,186 B2 | 3/2024 | Hayes et al. | |
| 12,321,931 B2 | 6/2025 | Childe et al. | |
| 12,586,072 B1 * | 3/2026 | Goldman | G06F 21/32 |
| 2021/0097528 A1 | 4/2021 | Wang | |
| 2021/0266148 A1 * | 8/2021 | Tsirkin | H04L 9/0897 |
| 2022/0122062 A1 | 4/2022 | Mayblum et al. | |
| 2025/0071118 A1 * | 2/2025 | Zmijewski | H04L 63/101 |
| 2025/0103733 A1 * | 3/2025 | Ortiz | G06F 12/1408 |
| 2025/0259043 A1 * | 8/2025 | Crabtree | G06N 3/047 |

OTHER PUBLICATIONS

Eric Schneider; "System, Method, Product, and Apparatus for Discrete Payload Object Provisioning and Attested Sequestration Confirmation Generation"; Unpublished U.S. Appl. No. 19/567,209, filed Mar. 15, 2026.

Eric Schneider; "System, Method, Product, and Apparatus for the Ledger Lifecycle of Attested Sequestration States"; Unpublished U.S. Appl. No. 19/635,628, filed Mar. 31, 2026.

Eric Schneider; "System, Method, Product, and Apparatus for Hardware-Node Lifecycle and Lineage Management"; Unpublished U.S. Appl. No. 19/639,199, filed Apr. 4, 2026.

Eric Schneider; "System, Method, Product, and Apparatus for Hardware-Attested Data Aggregation, Dynamic Liquidity Balancing, and Autonomous Settlement"; Unpublished U.S. Appl. No. 19/643,030; filed Apr. 9, 2026.

* cited by examiner

SYSTEM, METHOD, PRODUCT, AND DEVICE FOR HARDWARE SEQUESTRATION AND ATOMIC STATE-MODIFICATION OF DISCRETE-STATE DATA OBJECTS

FIELD OF THE DISCLOSURE

The present disclosure relates generally to the field of hardware-secured data management and trusted computing. More specifically, the disclosure relates to the atomic sequestration and state-modification of discrete-state data objects between authoritative data stores and hardware-protected execution environments.

BACKGROUND OF THE DISCLOSURE

The evolution of secure computing is defined by a structural trade-off between hardware-level isolation and network-wide synchronization. Early advancements in trusted execution environments focused on the creation of secure enclaves to protect data during active processing; however, these architectures were designed for containment rather than portability. Because they lack a native, hardware-level mechanism to cryptographically certify the "exit" of a data state, any transition to an external environment necessitates a fallback to software-based transport layers. This transition effectively dissolves the hardware-backed security guarantees the enclave was intended to provide, leaving the data vulnerable once it crosses the enclave boundary.

The subsequent rise of distributed ledger technologies attempted to solve for decentralized trust through continuous network consensus, yet this model introduced an "always-on" broadcast requirement. Such an architecture is fundamentally at odds with discrete, offline data sequestration, as the ledger cannot verify the state of an object held within a disconnected node. Simultaneously, database synchronization and transactional oracles attempted to bridge these gaps through remote locking protocols, but these remain tethered to the stability of the communication channel. A network interruption during a state-transition frequently results in irreconcilable "ghost" records or a permanent divergence between the originating store and the destination. Despite the maturity of these individual fields, a functional disconnect persists: no established pathway exists to treat a digital entity as a singular, mobile unit that can be atomically transferred from a data store to a hardware-protected environment with mathematical certainty.

Accordingly, in light of the above, there is a need for a mechanism that provides for the atomic state-modification and hardware sequestration of discrete-state data objects across disparate security domains.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY OF THE DISCLOSURE

The present disclosure relates to systems and devices for managing a hardware-sequestered machine-state through the use of hardware-protected execution environments and cryptographic ledgers. These systems facilitate the atomic state-modification and sequestration of discrete-state data objects to ensure that state transitions are verified and persisted across disparate security domains. By utilizing hardware-bound attestations and self-verifying instructions, the disclosed embodiments enable the secure synchronization of authoritative data stores with remote hardware environments.

In one aspect, a device for managing a hardware-sequestered machine-state includes an interface and a hardware-protected execution environment comprising a local non-volatile ledger. The hardware-protected execution environment is configured to perform an atomic state-modification of the local non-volatile ledger where the modification involves a transition of a discrete-state data object between an executable state and a non-executable state. The environment also generates an attestation record comprising a cryptographic attestation of the atomic state-modification and persists this record within the local non-volatile ledger for asynchronous transmission via the interface. The attestation record contains a self-verifying instruction to synchronize an external electronic data store with the atomic state-modification.

In another aspect, a device for managing a hardware-sequestered machine-state includes an interface and a hardware-protected execution environment configured to receive a remote attestation record via the interface. The hardware-protected execution environment identifies a hardware-bound nullifier and a discrete-state data object within the remote attestation record. It further verifies an integrity-state of an originating hardware-source via a hardware-root-of-trust and ingests the discrete-state data object into a local non-volatile ledger only upon successful verification of the integrity-state and the hardware-bound nullifier.

In a further aspect, a system for managing a hardware-sequestered machine-state includes an authoritative electronic data store, a network interface configured to communicate with a remote node, and a processor. The processor is configured to verify a hardware-attestation certificate received from the remote node to confirm an integrity-state of a destination hardware-protected execution environment and to execute a temporary state-lock on a data-state within the authoritative electronic data store. The processor generates a provisioning-payload cryptographically bound to a hardware-attested identity of the destination environment. The network interface transmits the provisioning-payload to the remote node and receives an attestation record comprising a proof of sequestration generated by the destination environment. Upon verifying the attestation record, the processor transmits a finalization instruction to the authoritative electronic data store to convert the temporary state-lock into a permanent authoritative state-modification.

In another aspect, a device for managing a hardware-sequestered machine-state includes an interface and a hardware-protected execution environment comprising a local non-volatile ledger. The hardware-protected execution environment ingests a discrete-state data object originating from a first external electronic data store and executes a hardware-enforced state-transition to move the discrete-state data object into a sequestered non-executable state within the local non-volatile ledger. The environment generates a hardware-attested record comprising a proof of the sequestered non-executable state and transmits the record via the interface to authorize a target-state modification within a second external electronic data store.

In a further aspect, a system for managing a hardware-sequestered machine-state includes a distributed electronic data store, a network interface configured to receive a hardware-signed attestation record originating from a hardware-protected execution environment, and a verification engine. The verification engine is configured to validate a hardware-root-of-trust associated with the hardware-signed attestation record and extract a self-verifying instruction and a hardware-bound nullifier. The engine queries the distributed electronic data store to verify that the hardware-bound nullifier has not been previously committed and updates a state of the distributed electronic data store to reflect a discrete-state modification as defined by the self-verifying instruction.

In another aspect, a device for managing a hardware-sequestered machine-state includes an interface and a hardware-protected execution environment. The hardware-protected execution environment receives a transaction-manifest identifying a state-transition between a first external entity and a second external entity. It performs an atomic state-modification to execute a temporary sequestration of a discrete-state data object within a local non-volatile ledger and generates a multi-party attestation record in response to a cryptographic invocation comprising a dual-cryptographic handshake from both the first and second external entities. The multi-party attestation record is then output via the interface.

In accordance with additional aspects of the present disclosure, there are provided various methods, apparatuses, systems, and non-transitory computer-readable media that implement the functionality described herein. It is expressly contemplated that any functional step described in relation to a method shall find corresponding support as a structural component of an apparatus or system, and any structural feature described as part of an apparatus or system shall find corresponding support as a step in a method of operation. Specifically, the disclosure provides an apparatus and system configured to implement the functionality of the methods described above, as well as a non-transitory computer-readable medium comprising instructions that, when executed by a processor, cause the processor to perform said methods and realize the technical objectives of the recited apparatuses.

The present disclosure provides a hardware architecture designed to transform digital information into a sovereign, physical-like asset through the process of sequestration. By isolating a dedicated execution environment from a device's primary operating system, the system creates a secure boundary where data is governed by hardware logic rather than software permissions. This ensures that once a digital object is moved into the device's local ledger, it is structurally protected from remote administrative interference, unauthorized replication, or network-layer injection attacks.

Unlike conventional fintech systems that rely on centralized databases to track ownership, this architecture utilizes a hardware state machine to enforce absolute digital scarcity. When an asset is ingested, it undergoes an atomic modification that transitions it into a non-executable state, effectively locking it in silicon. This transition is backed by the generation of self-verifying attestation records, which allow external networks to mathematically confirm the device's possession and integrity without requiring access to private user data. This shift from "permission-based" to "physics-based" custody eliminates counterparty risk and ensures that the user remains the sole arbiter of their digital property.

Furthermore, the system provides a resilient framework for high-stakes transitions and cross-ledger interoperability. Through the use of temporal windows and autonomous reversion logic, the hardware ensures that assets are never trapped in a pending state due to network failure. By mapping hardware-sequestered values to various external protocols—from legacy banking mainframes to modern blockchains—the system forces disparate technologies to recognize a single, unified source of truth anchored in the device's silicon. This creates a universal bridge for sovereign identity, industrial commands, and financial assets, where the physicality of the hardware provides the ultimate guarantee of transaction finality.

The foregoing and other features of the present disclosure are hereinafter fully described and particularly pointed out in the claims. The following description and the annexed drawings set forth in detail one or more illustrative aspects of the disclosure, such being indicative, however, of but one or a few of the various ways in which the principles of the described embodiments and their equivalents may be employed.

DETAILED DESCRIPTION OF THE DISCLOSURE

Figure 1:
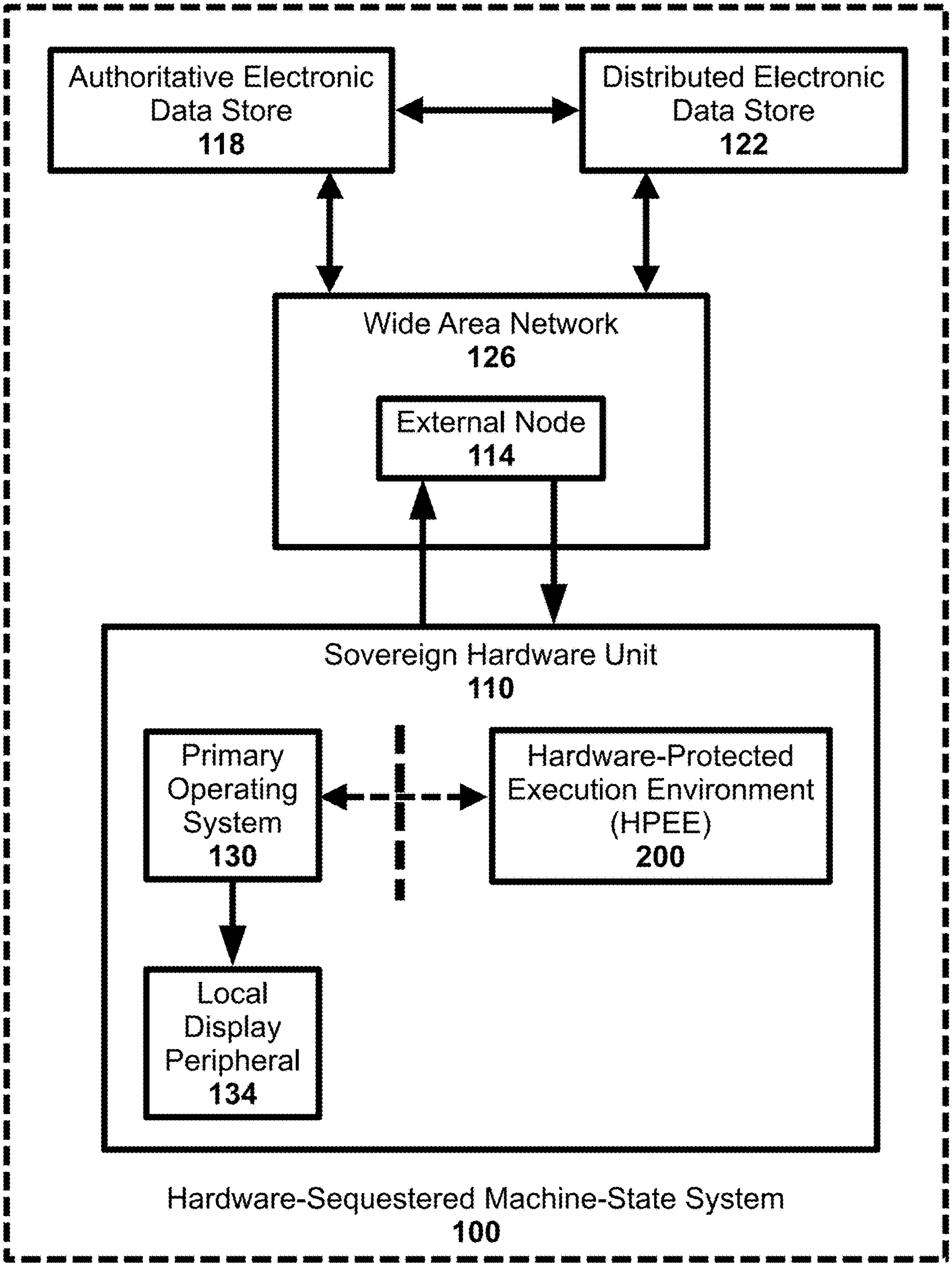
FIG. 1 is a block diagram representing a high-level system architecture including a device, an external node, and external data stores in accordance with the present disclosure.

The present disclosure will now be described with reference to the drawings, wherein like reference numerals are used to refer to like elements disclosed herein.

For the purposes of the present disclosure, the following technical terms and phrases are to be interpreted according to the specific definitions and functional requirements set forth below, notwithstanding any broader or more generic usage found in external dictionaries or industry standards.

The following technical definitions have been grouped into thematic paragraphs by concatenating the original sentences. These are provided verbatim and untruncated to serve as a cohesive foundation for the disclosure.

Hardware protected execution environment (HPEE) is defined as an architecturally sequestered or logically isolated processing zone within a chip configured to keep sensitive operations and data sequestered from external interference or observation; unlike a fixed-function ASIC, the HPEE acts as a sovereign logic unit capable of executing dynamic state-management instructions to modify the utility of data in real-time. Hardware state machine means a computational logic unit implemented in hardware circuitry that enforces strict, predefined rules over state transitions, acting as a physical gatekeeper that subjects externally-sourced data to hardware-level validation to ensure transitions are irrevocable once a cryptographic attestation is generated. Silicon root of trust refers to a hardware-based security foundation embedded directly into the physical silicon of a chip to provide an unforgeable basis for trust. Hardware root of trust refers to a foundational security source within the hardware architecture used for cryptographic verification operations. Direct to silicon instruction set refers to the lowest-level commands executed directly by the hardware processor without reliance on the primary operating system's kernel or intermediate translation layers.

Sequestration is defined as the hardware-enforced architectural restriction of a discrete state data object to a hardware-isolated memory partition, where the object is governed by mutually exclusive states (e.g., an executable state vs. a non-executable state). Discrete-state data object refers to a specific unit of information that is technically restricted to occupy distinct, mutually exclusive conditions, such as being in an executable state or a non-executable state; this object functions as an entity whose "discreteness" is a hardware-enforced property derived from hardware-level state-constraints, which prevents the object from existing in more than one state or location simultaneously. Data state represents the specific value, status, or current condition of a data object at any given moment. Executable scalar value is defined as a numerical magnitude representing a spendable or usable balance within a data object, whereas scalar value refers to any numerical magnitude representing an amount or value within a data object. Mapping ratio refers to the specific conversion relationship or proportional exchange rate defined between different categories of data objects. Asset class identifier means a categorical tag that distinguishes the specific nature or type of a data object to ensure it is handled according to appropriate logic.

Atomic state modification means a change to a ledger or record that is technically indivisible, requiring that the modification must either complete in its entirety or fail entirely without partial execution; this atomicity ensures that multiple changes, such as the shredding of a local record and the persistence of an attestation, occur as a single logical unit of work triggered by hardware-verified external ingestion to prevent "residue" errors. Hardware enforced state transition refers to a movement of a data object between states that is mandated, managed, and controlled exclusively by hardware-level logic. Hardware enforced journaled transaction means a method of recording discrete transaction steps within the hardware to facilitate persistent state-consistency or state restoration in the event of a system failure. Local non-volatile ledger is defined as a permanent, on-device record of events and states that survives the loss of power. Hardware protected ledger refers to a secure log of transitions and states maintained exclusively within the hardware's protected execution zone. Shadow ledger means a secondary tracking record used to monitor and verify states before they are formally committed or finalized in a primary record.

Attestation record is defined as a cryptographically signed proof generated by the hardware to verify that a specific hardware event or state change has occurred. Cryptographic attestation refers to the process of using digital signatures to provide proof of hardware or data integrity. Hardware attested record refers to a specific data log that is cryptographically tied to the unique integrity and identity of the physical hardware. Cumulative attestation record means a single summary proof that aggregates and represents multiple discrete hardware events within one record. Multi-party attestation record refers to a verification document that incorporates and requires cryptographic inputs or signatures from several different distinct entities. Hardware signed instruction is defined as a command that carries the unique digital signature of the physical hardware to prove its specific origin. Self-verifying instruction refers to a specialized command containing all the necessary cryptographic evidence and data required for any recipient to independently prove its validity without external lookups, enabling the silicon enclave to act as a cryptographically verifiable authoritative source for its own sequestered states.

Interface refers to a multi-modal communication gateway configured to manage the secure boundary where the secure hardware environment meets and communicates with external systems via hardware-level parsing, supporting a plurality of data paths including, but not limited to, wired, wireless, and optical sensors. Trusted user interface (TUI) means a secure display or input mechanism controlled strictly and exclusively by the hardware to prevent data interception by a primary operating system. Optical sensor refers to a hardware component configured to capture visual data, such as QR codes or modulated light signals, for ingestion and processing within the secure zone. Biometric authentication is defined as the verification of an individual's identity based on unique physical characteristics. Secondary hardware token refers to an additional physical device used to provide a multi-factor layer of cryptographic authorization. Co-signing signature refers to an additional digital signature required from a secondary party to authorize a task. Multisig combination refers to a technical requirement for a specific set or threshold of multiple digital signatures to authorize a single action.

Cryptographic handshake refers to an automated negotiation process used by two parties to establish a secure communication link. Dual cryptographic handshake is defined as an automated negotiation requiring mutual, two-way verification and signatures from both parties to establish a secure link. Public key infrastructure (PKI) refers to the overarching system of digital certificates, public keys, and private keys used to manage encryption and identity verification. Cryptographic identifier means a unique digital label used to distinguish one specific entity, data object, or record from all others. Hardware attested identity refers to a unique, unforgeable digital identity verified by the physical chip. Unique hardware-attested identity refers to a permanent and verifiable digital fingerprint inherent to a specific, individual piece of hardware. Transient session key means a temporary security key created for a single communication session and destroyed immediately upon its conclusion. Provisioning payload refers to the initial data set delivered to a hardware environment to enable its specific operational state or functionality.

External node means any computing point, terminal, or device located outside the primary hardware. External electronic data store refers to a data storage system located outside of the specific hardware device. Authoritative electronic data store refers to a system of record located outside the hardware that is designated as the primary or official source for specific data. Distributed electronic data store is defined as a database or ledger spread across and synchronized among multiple network nodes. Blockchain refers to a distributed ledger structure using linked blocks of data. Directed acyclic graph (DAG) refers to a distributed ledger structure using non-linear, directed connections between data points. Distributed hash table (DHT) refers to a decentralized system for looking up data based on keys. Consensus protocol means the technical mechanism and agreement method used by distributed systems to agree on a single data value or state. Smart contract refers to self-executing code deployed on a ledger that autonomously manages state updates and enforces rules.

Transaction manifest is defined as a formal document defining the specific parameters, conditions, and requirements for a proposed state transition. Hardware locked escrow token refers to a discrete-state data object held by hardware in a non-executable state until specific external or internal conditions are satisfied. Deterministic nullifier means a unique value derived from specific data used to prevent that data from being processed more than once. Hardware bound nullifier refers to a unique security token derived from and tied to specific hardware that prevents a specific action or object from being replayed or used more than once. Monotonic sequence nonce refers to an ever-increasing number used to order transactions and prevent replay attacks within a single store. Cross store sequence nonce refers to a unique number used to maintain order and prevent replays across multiple different data stores. Hardware enforced reversion nonce means a unique code that triggers an automatic return to a verified previous state if a process fails, resulting in a reversal-proof record, distinguishing the architecture from static hardware by its ability to perform reconciled, dynamic state reversals.

Cryptographic acknowledgment refers to a secure signal confirming that a message was received. Cryptographic confirmation refers to a verified digital proof that a specific action has occurred. Cryptographic receipt refers to a signed confirmation issued after the successful ingestion or transfer of a data object. Synchronization confirmation is defined as a specific signal indicating that an external data store has successfully matched its recorded state to the state held within the hardware. Outbound queue means the memory buffer configured to hold generated attestation records or proofs while they wait for transmission. Temporal window refers to a defined and restricted timeframe in which a specific action must be initiated or completed. Threshold timer expiration means an event triggered when a pre-set duration of time has elapsed. Proximate trigger signal refers to a local communication or broadcast that initiates a hardware action based on the physical closeness of a signaling source.

Compliance check is defined as an automated audit performed by the hardware to ensure data or transactions conform to specific regulatory, technical, or logical rules. Protocol translation refers to the process of providing a cryptographically verifiable attestation formatted for compatibility with different communication formats or languages. Verification engine means the logic, implemented in software or hardware, that validates the authenticity and integrity of attestation records. Global revocation list refers to a database of compromised or untrust hardware identities. Cross-manufacturer root of trust registry means a shared repository of certificates used to verify hardware from different vendors. Publicly-verifiable state-repository refers to a transparent and accessible record system that allows any party to independently audit or verify hardware states. Cross-ledger state transition is defined as the process of moving the state of a data object from one ledger system to another. Cross-ledger settlement refers to the finalization of a transaction involving two distinct ledger systems. Bridge state refers to a temporary intermediate state used during the transfer of data between ledgers. Cross-store state reconciliation fee refers to a calculated charge for the technical synchronization of states between different stores. Non-repudiation proof refers to the cryptographic evidence that prevents a party from denying they performed a specific action. Cryptographic invalidation means the formal act of rendering a previously valid digital state, key, or record void.

Having defined the technical terms and functional requirements above, the structural implementation and operative environment of these components will now be described with reference to the accompanying drawings. The following embodiments are provided as non-limiting examples intended to illustrate the principles of the disclosure rather than to restrict the scope of the claims.

Referring to FIG. 1, a Hardware-Sequestered Machine-State System 100 establishes a physical and logical framework for the transition of digital control between networked environments and localized hardware. The Hardware-Sequestered Machine-State System 100 is architected to facilitate the relocation of a Discrete State Data Object 322 (see FIG. 3) from an external environment into a state of hardware sequestration. In this sequestered state, the Discrete State Data Object 322 is held under the governance of physical hardware logic, operating independently of remote administrative influence. The system comprises a functional arrangement of a Sovereign Hardware Unit 110, an External Node 114, an Authoritative Electronic Data Store 118, and a Distributed Electronic Data Store 122, which are communicatively coupled via a Wide Area Network 126.

The Sovereign Hardware Unit 110 is a physical hardware unit configured to receive, secure, and manage a sequestered machine-state. To maintain a functional bifurcation between general-purpose computing and secure state-management, the Sovereign Hardware Unit 110 executes a Primary Operating System 130 and a Hardware-Protected Execution Environment (HPEE) 200 (see FIG. 2). The Primary Operating System 130 manages high-level tasks including network stacks and user interfaces, while being architecturally sequestered from the HPEE 200. This isolation ensures the Primary Operating System 130 lacks the cryptographic authority and memory access required to modify sequestered data objects, functioning as a transport layer decoupled from the secure state-logic. Human-readable state-verification is provided via a Local Display Peripheral 134, which is configured to display human-readable state information.

The Authoritative Electronic Data Store 118 and the Distributed Electronic Data Store 122 provide the external data environments for the machine-state lifecycle. The Authoritative Electronic Data Store 118 functions as a primary external system of record that initiates a state-lock to enable sequestration, thereby creating a verifiable condition that the Sovereign Hardware Unit 110 requires to assume governance, while the Distributed Electronic Data Store 122 provides a multi-node consensus-validated record configured to synchronize via attestation records. Interaction between these environments and the Sovereign Hardware Unit 110 is facilitated by the External Node 114, which packages data including encrypted payloads and self-verifying instructions into a hardware-compatible format for ingestion through the Wide Area Network 126.

The Hardware-Sequestered Machine-State System 100 enables the transition of a machine-state through a coordinated verification process. The External Node 114 manages the transmission of a provisioning-payload to the Sovereign Hardware Unit 110, while the Sovereign Hardware Unit 110 provides a hardware-signed attestation record back to the system. This exchange ensures the Discrete State Data Object 322 is represented either within the external stores or sequestered within the Sovereign Hardware Unit 110. By anchoring the state in hardware rather than software, the Hardware-Sequestered Machine-State System 100 allows the Sovereign Hardware Unit 110 to maintain a locally-governed machine-state anchored in silicon hardware that remains structurally synchronized with the external infrastructure.

In a practical application of the Hardware-Sequestered Machine-State System 100, consider a user withdrawing a digital asset from a centralized exchange to their physical device. In this scenario, the Authoritative Electronic Data Store 118 (the exchange) executes a verifiable state-nullification of its administrative control over the specific asset, allowing the Sovereign Hardware Unit 110 to seize and sequester that state as a peer-level authority. This systemic hand-off ensures the asset is no longer a "permission" granted by a remote server, but a locally-governed machine-state anchored in silicon, mitigating risks associated with account freezes or platform insolvency. To maintain this level of state-authoritative logic, the hardware utilizes a specialized internal architecture to defend the sequestered state from the vulnerable primary operating system of the unit, as detailed in the components of FIG. 2.

Figure 2:
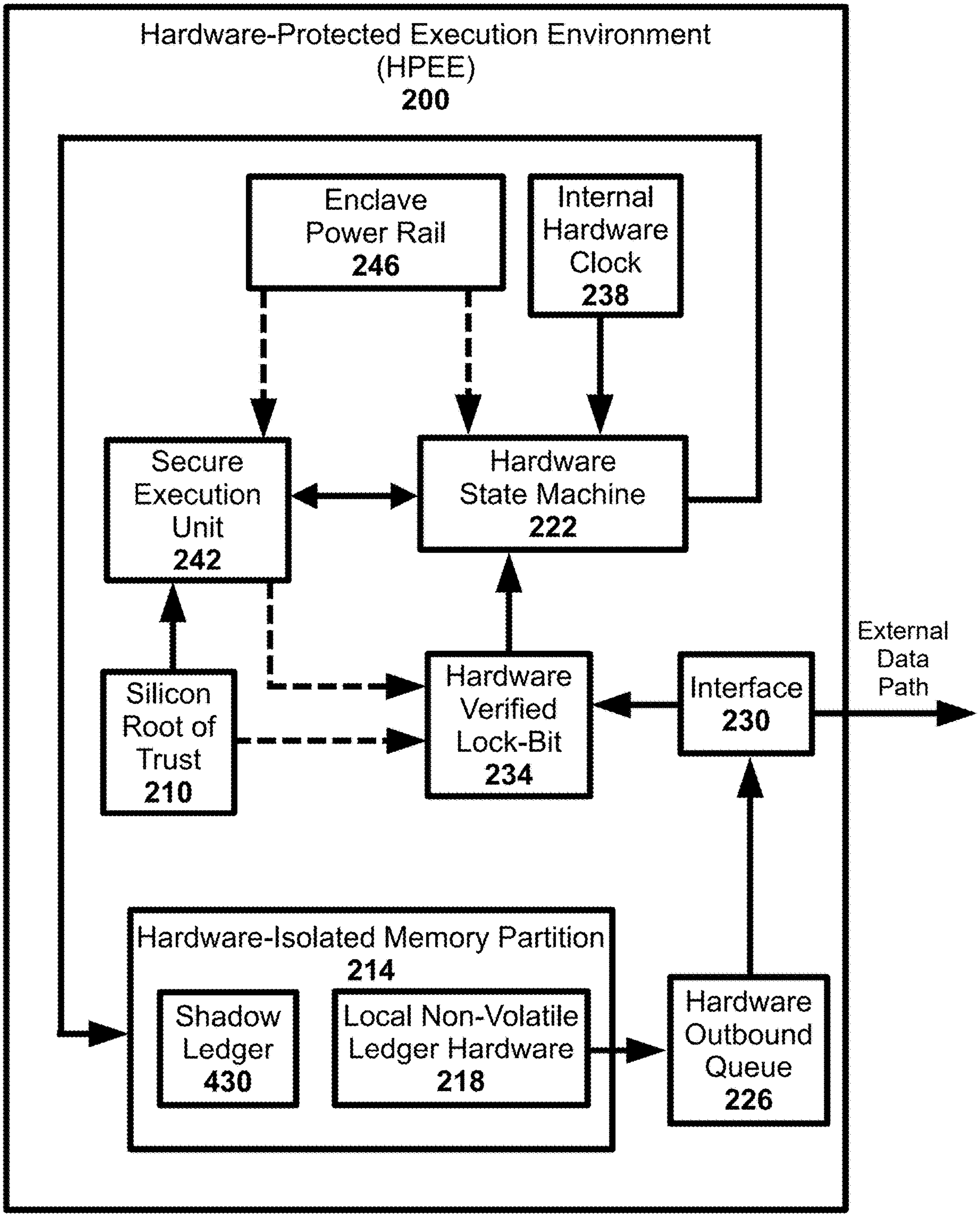
FIG. 2 is a block diagram representing the internal components of a hardware-protected execution environment including a silicon root of trust and a hardware-isolated memory partition in accordance with the present disclosure.

Referring to FIG. 2, the internal architecture of a Sovereign Hardware Unit 110 (see FIG. 1) is illustrated, specifically detailing a Hardware-Protected Execution Environment (HPEE) 200 configured to govern sequestered machine-states. The HPEE 200 is a secure silicon enclave that is architecturally sequestered and logically isolated from the Primary Operating System 130. This isolation is enforced at the hardware level, ensuring that the machine-state logic operates within a trusted boundary that is restricted from access by general-purpose software or unauthorized external interference.

The foundation of this secure boundary is a Silicon Root of Trust 210, which is embedded directly into the physical circuitry of the chip. The Silicon Root of Trust 210 provides the cryptographically unique identity and foundational security primitives required to verify the integrity of the HPEE 200. This process is driven by a Secure Execution Unit 242, which serves as the physical logic execution and cryptographic processing core within the enclave. To ensure temporal integrity independent of the potentially compromised host system, the HPEE 200 includes an Internal Hardware Clock 238, which may comprise a discrete physical oscillator, a monotonic hardware counter, or a secure temporal primitive, and is configured for hardware-governed timing as the source for non-adjustable timestamps used to invalidate expired or replayed instructions. Persistent operation and the ability to execute emergency state-reversions are supported by an Enclave Power Rail 246, which provides a dedicated power delivery path configured to provide the electrical potential required to complete a final write-cycle to the secure enclave during a power-loss event.

Coupled with the processing core is a Hardware-Isolated Memory Partition 214, a dedicated region of memory that is architecturally and logically gated from the Primary Operating System 130. Within this partition, a Local Non-Volatile Ledger Hardware 218 is provided. This hardware component implements the Local Non-Volatile Ledger Architecture 400 (see FIG. 4), which serves as the authoritative, on-device record of events and states that survives the loss of power to ensure continuity of possession. To manage transitions that are pending external confirmation or subject to potential recovery, the partition further comprises a Shadow Ledger 430, which tracks intermediate states before they are formally committed to the Local Non-Volatile Ledger Architecture 400.

State transitions within the enclave are governed by a Hardware State Machine 222. The Hardware State Machine 222 executes Direct-to-Silicon Instructions 310 via the Secure Execution Unit 242 to gate modifications to the Local Non-Volatile Ledger Hardware 218. A Hardware-Verified Lock-Bit 234 acts as a functional cryptographic gating mechanism configured to interrupt internal data flow until hardware-level conditions are met. When a state change is finalized, the HPEE 200 generates a cryptographic proof, which is placed in a Hardware Outbound-Queue 226. In the context of the ledger architecture, this is represented as the Ledger Outbound-Queue 434, a logical memory buffer within the isolated partition configured to hold generated Attestation Records 438 for asynchronous transmission via the Interface 230.

The HPEE 200 communicates with the external system through a specialized Interface 230 which comprises a protocol-agnostic ingestion logic gateway configured to manage the secure, bidirectional data flow between the isolated enclave and the external components of the Sovereign Hardware Unit 110. To ensure the system is not limited by any specific transmission medium, the Interface 230 is configured to support a plurality of physical and logical data paths including, but not limited to, wired connections (e.g., USB, Ethernet, or serial bus), wireless transceivers (e.g., NFC, Bluetooth, or cellular), and optical or proximate sensors utilizing an Optical Sensor Interface 1118. The Interface 230 is communicatively coupled to the Hardware State Machine 222 and is configured to receive data from non-sequestered device peripherals, subjecting said data to hardware-level parsing to verify integrity. The Interface 230 is further configured to permit the outward transmission of attestation records from the Hardware Outbound-Queue 226 while preventing the inward propagation of unauthorized commands.

By centering all state-logic within the HPEE 200 and providing it with its own dedicated processing via the Secure Execution Unit 242, independent timing via the Internal Hardware Clock 238, and isolated energy via the Enclave Power Rail 246, the system ensures that the state-authoritative logic is anchored in physical silicon rather than vulnerable software layers. This multi-modal approach ensures the Sovereign Hardware Unit 110 can maintain state integrity across disparate physical and digital environments, functioning as a primary authoritative record for the sequestered state regardless of the ingestion method.

In a practical application of the HPEE 200, consider the risk of "Root Access" malware on a user's smartphone. Because the Hardware-Isolated Memory Partition 214 is architecturally and logically gated from the Primary Operating System 130, and the Internal Hardware Clock 238 cannot be manipulated by software, the malware is incapable of accessing or modifying the digital assets stored within the Local Non-Volatile Ledger Hardware 218 or the Shadow Ledger 430. This hardware-isolated enclave logic ensures that the assets remain secure even on a compromised device. For any movement of these assets to occur, the system must invoke a specific atomic sequence of logic that triggers the hardware gate through the Interface 230, as detailed in the Atomic State-Modification Logic 300 of FIG. 3.

Figure 3:
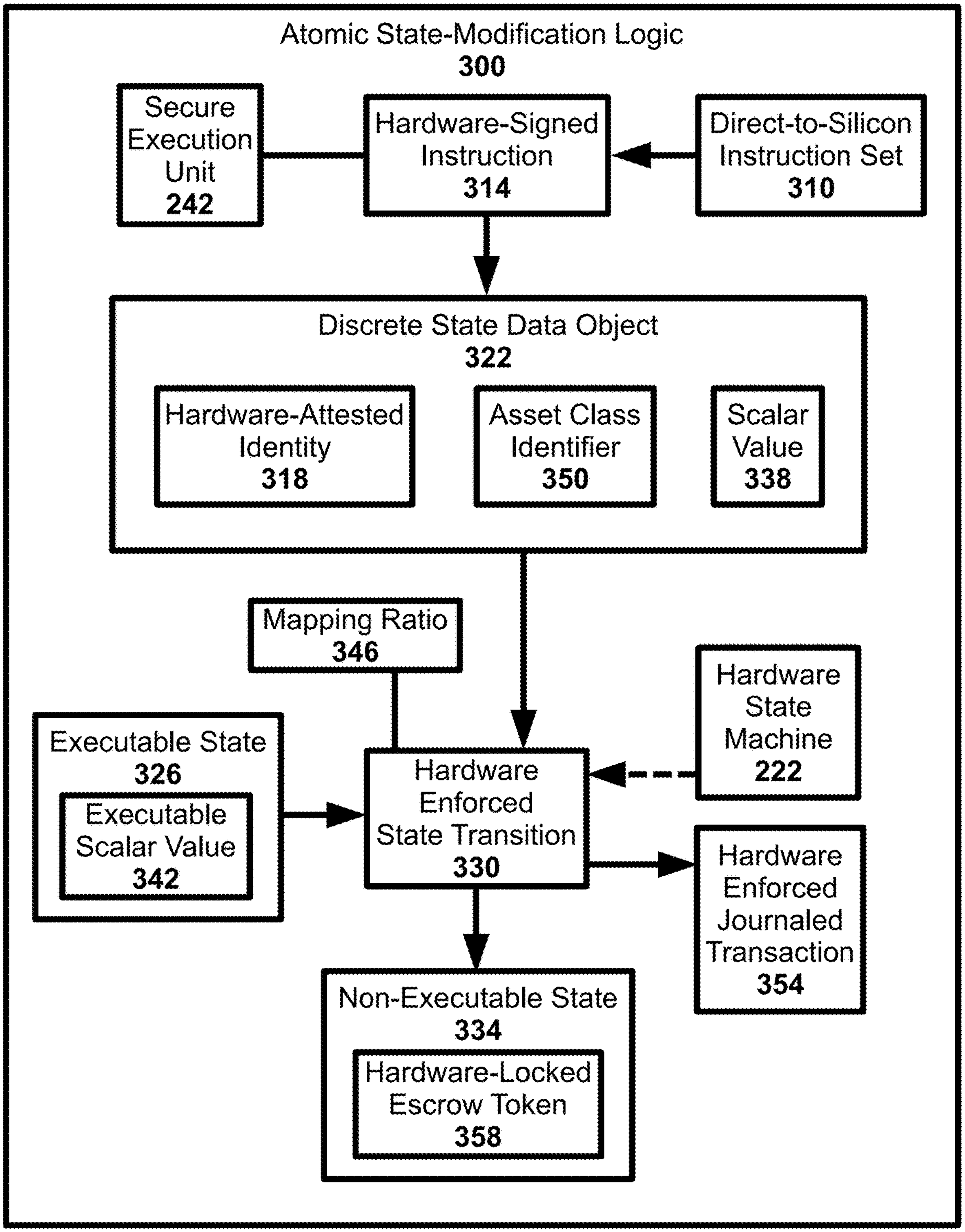
FIG. 3 is a functional block diagram illustrating the logic for an atomic state-modification of a discrete-state data object and hardware-enforced journaling in accordance with the present disclosure.

Referring to FIG. 3, the Atomic State-Modification Logic 300 is illustrated, providing the functional sequence for transitioning the condition of data within the HPEE 200 (see FIG. 2) as a single logical operation. The Atomic State-Modification Logic 300 is configured to ensure that a state change is either completed in its entirety or not executed at all, preventing inconsistent data states. This logic is executed through a Direct-to-Silicon Instruction Set 310, comprising low-level commands processed by the Secure Execution Unit 242. These commands may be implemented via hardware-bound firmware, microcode, or hard-wired logic that is architecturally independent of the Primary Operating System 130. These commands are formatted as a Hardware-Signed Instruction 314, which carries a digital signature or cryptographic proof generated by the hardware to verify the instruction's authenticity and origin before execution by the silicon core.

The subject of this logic is the Discrete State Data Object 322, a specific unit of information technically restricted to distinct, hardware-governed conditions. Every Discrete State Data Object 322 is cryptographically bound to a Hardware-Attested Identity 318, which serves as a unique identifier verified by the physical chip. The Discrete State Data Object 322 further comprises a Scalar Value 338, representing the numerical magnitude associated with the object, and an Asset Class Identifier 350, which distinguishes the specific category of the data being governed.

The Hardware State Machine 222 (see FIG. 2) utilizes this logic to manage a Hardware-Enforced State Transition 330 between an Executable State 326 and a Non-Executable State 334. In the Executable State 326, the object possesses an Executable Scalar Value 342, rendering it available for utility or external transfer. Conversely, in the Non-Executable State 334, the object is sequestered and structurally locked within the hardware, represented as a Hardware-Locked Escrow Token 358. The relationship between different classes of objects during these transitions is governed by a Mapping Ratio 346, which functions as the logic gate for multi-asset parity by enforcing conversion rules during the atomic write to provide mathematical consistency across asset types.

To ensure systemic resilience, the Atomic State-Modification Logic 300 incorporates a Hardware-Enforced Journaled Transaction 354. This method functions as a pre-commitment state-mirror by logging each discrete step of the transition within the hardware to provide a recovery mechanism (see FIG. 9) in the event of a process interruption. By enforcing these transitions via the Secure Execution Unit 242, the system ensures that a Discrete State Data Object 322 cannot exist in an indeterminate state, effectively emulating the physical properties of matter where an object cannot simultaneously occupy two distinct states.

In a practical application of the Atomic State-Modification Logic 300, FIG. 3 marks the definitive moment a digital asset is transferred into the user's direct control. By executing the Hardware-Signed Instruction 314, the silicon performs a "handshake of possession," where the Scalar Value 338 is moved from a network-dependent Executable State 326 into a sequestered Non-Executable State 334. This transition ensures the asset is hardware-locked within the chip. This shift from a digital entry to a hardware-bound state creates a requirement for a permanent, chronological record to prevent the asset from being replayed, a process governed by the logic of FIG. 4.

Figure 4:
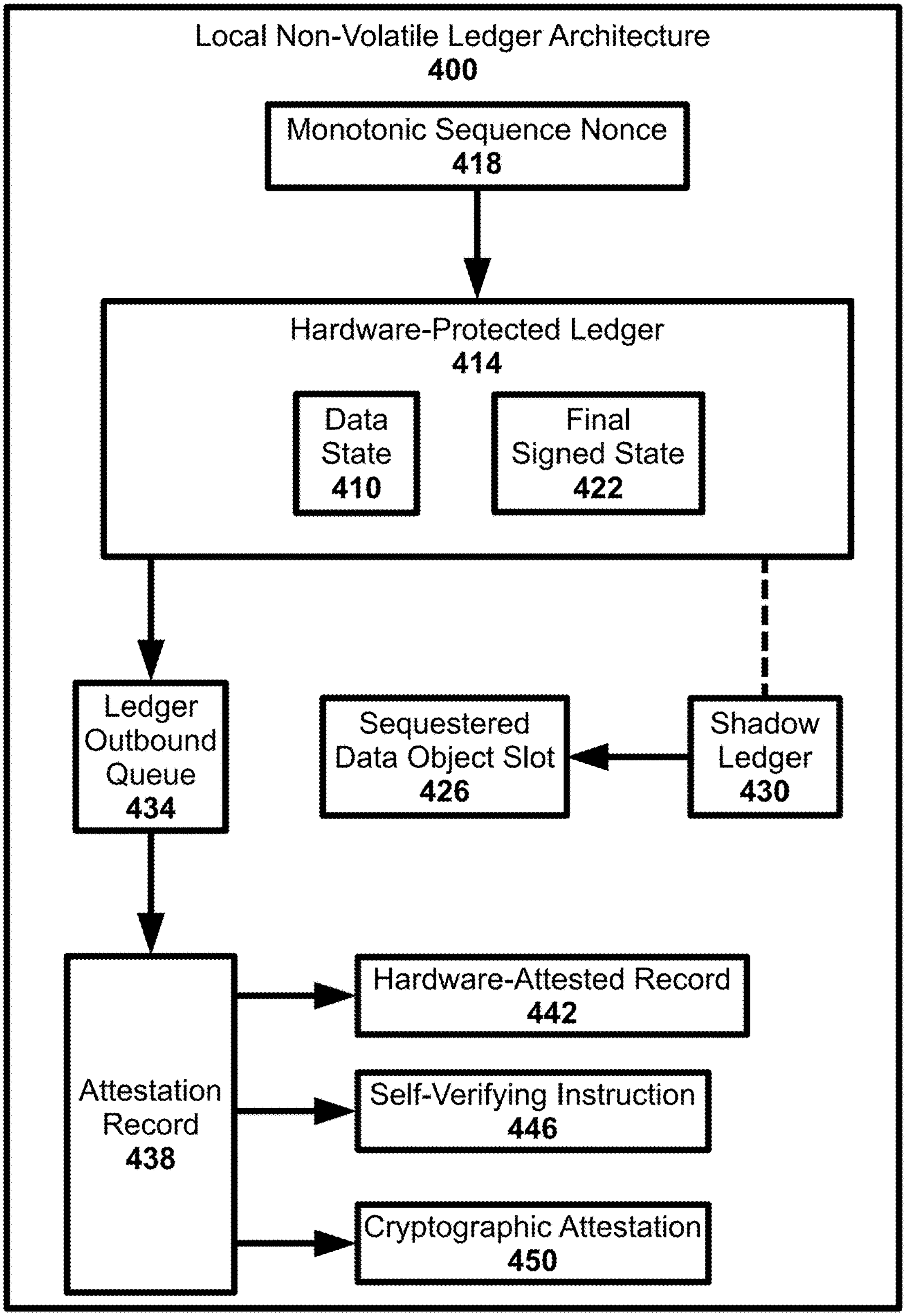
FIG. 4 is a block diagram representing a local non-volatile ledger containing a sequestered data object, a monotonic sequence nonce, and an outbound-queue in accordance with the present disclosure.

Referring to FIG. 4, the Local Non-Volatile Ledger Architecture 400 and its associated ordering logic are illustrated, establishing an authoritative chronological record of states within the HPEE 200 (see FIG. 2). The Local Non-Volatile Ledger Architecture 400 is configured to maintain the integrity of the sequestered environment by ensuring that every state change is recorded as a permanent, verifiable event. This ledger includes a Hardware-Protected Ledger 414 zone, which is a secure memory region within the Hardware-Isolated Memory Partition 214 (see FIG. 2) that is architecturally sequestered from the Primary Operating System 130.

Central to the chronological integrity of the system is the Monotonic Sequence Nonce 418. This component is a sequentially advancing value or temporal anchor used to uniquely order transactions and mitigate replay attacks. The Monotonic Sequence Nonce 418, supported by the Internal Hardware Clock 238, ensures that the Hardware State Machine 222 (see FIG. 2) only processes instructions in a forward-moving, sequential manner. Each entry in the ledger defines a Data State 410, representing the current condition of information, which culminates in a Final Signed State 422. This signed state represents the authoritative condition of the ledger immediately prior to the initiation of a new event.

The Local Non-Volatile Ledger Architecture 400 further utilizes specialized memory structures to manage objects in various stages of sequestration. A Sequestered Data Object Slot 426 is provided as a dedicated memory location within the ledger for non-executable objects, such as a Hardware-Locked Escrow Token 358 (see FIG. 3). To manage transitions without risking the corruption of the primary record, a Shadow Ledger 430 is employed as a staging buffer to monitor and verify proposed states before they reach final commitment to the Local Non-Volatile Ledger Architecture 400. Once a transition is committed, an Attestation Record 438 is generated and placed in the Ledger Outbound-Queue 434—the functional egress buffer—for external synchronization.

The generated Attestation Record 438 is formatted as a Hardware-Attested Record 442, which is cryptographically tied to the hardware's unique identity. This record includes a Self-Verifying Instruction 446, providing a logic payload that includes the evidentiary data required for an external system to confirm the state change independently. The validity of this evidence is reinforced by a Cryptographic Attestation 450, providing a digital signature that verifies the integrity of the originating hardware. By anchoring the ledger in silicon and enforcing a strict monotonic sequence, the system ensures that the possession of a digital state is chronologically definite.

In a practical application of the Local Non-Volatile Ledger Architecture 400, FIG. 4 represents the chronological finality of the silicon—a one-way progression of time designed to make double-spending or replaying a transaction logically infeasible. By utilizing the Monotonic Sequence Nonce 418, the hardware ensures it cannot be forced into repeating a previous state or accepting a cloned instruction. Every action leaves an indelible mark in the Hardware-Protected Ledger 414, creating a trail of evidence that external systems can verify without needing direct oversight of the Sovereign Hardware Unit 110. This internal certainty provides the foundation for the secure hand-off process where a remote server surrenders its control of an asset to the unit, as detailed in the provisioning flow of FIG. 5.

Figure 5:
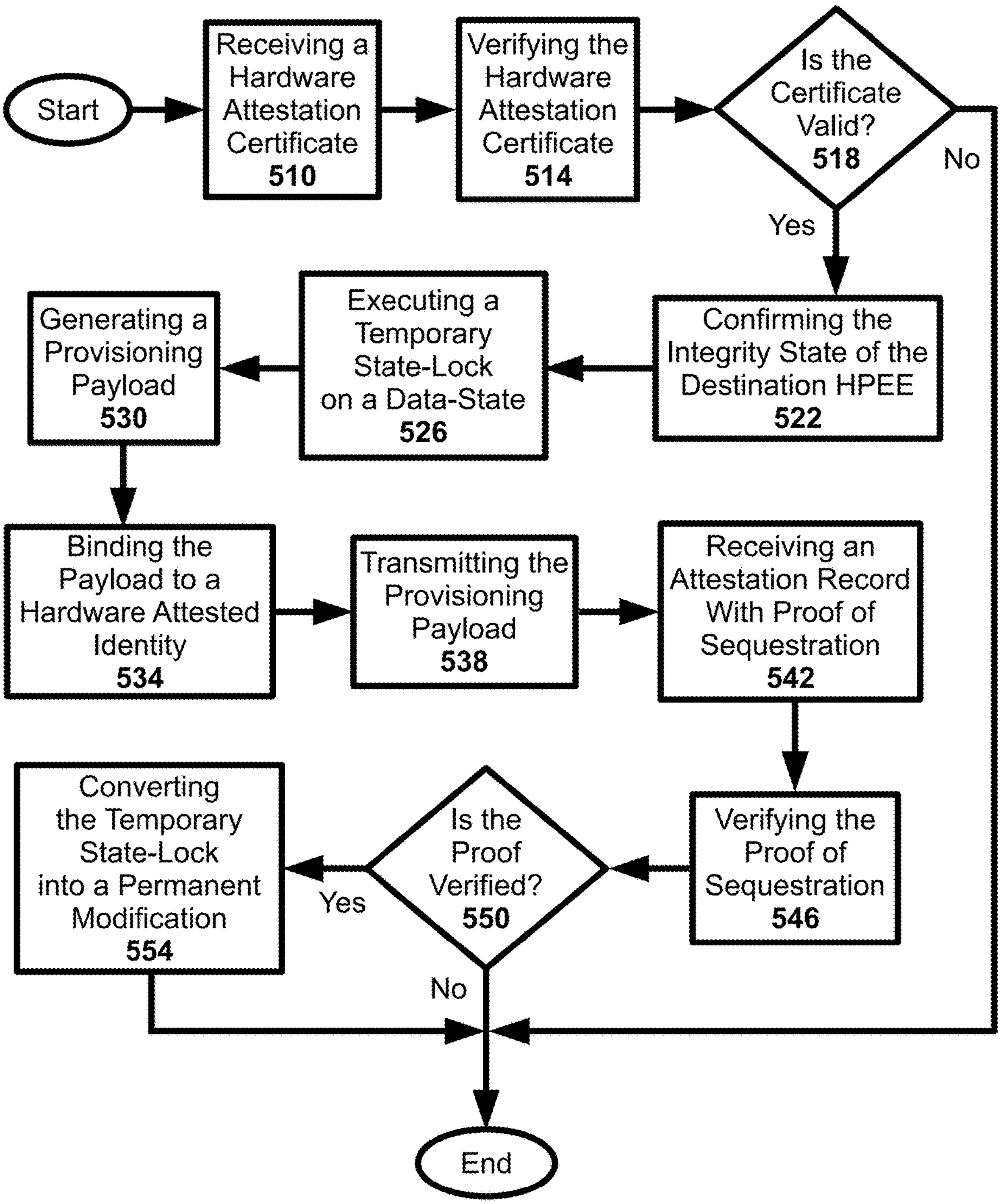
FIG. 5 is a flowchart illustrating the operational steps for verifying a hardware-attestation certificate and generating a provisioning-payload in accordance with the present disclosure.

Referring to FIG. 5, the Provisioning Logic Flow is illustrated, detailing the operational sequence for authorizing and delivering a data object to a destination. The Provisioning Logic Flow establishes the protocol by which an external authority surrenders a digital state to the hardware control of a Sovereign Hardware Unit 110 (see FIG. 1). This process initiates with receiving at step 510 a hardware-attestation certificate from the destination via the network, followed by verifying at step 514 the hardware-attestation certificate against a cross-manufacturer root of trust registry to verify the hardware is authentic and untampered.

It is determined at step 518 whether the certificate is valid. Upon a positive determination, the system proceeds to confirming at step 522 the integrity-state of the destination HPEE 200. This step utilizes the Secure Execution Unit 242 to verify that the remote hardware is in a secure condition prior to any data transmission. Once integrity is confirmed, the system performs the step of executing at step 526 a temporary state-lock on a data-state within the Authoritative Electronic Data Store 118, freezing the record to mitigate double-allocation during the transition.

The transition continues with generating at step 530 a provisioning-payload, which involves creating an encrypted data package for the object to be sequestered. This is followed by binding at step 534 the payload to a hardware-attested identity, a cryptographic process configured to ensure the encrypted data is mathematically restricted to the specific, verified destination identity for decryption and ingestion. The sequence then moves to transmitting at step 538 the provisioning-payload to the remote node.

The final phase of the flow involves receiving at step 542 an attestation record with proof of sequestration from the Sovereign Hardware Unit 110. The system performs the step of verifying at step 546 the proof of sequestration, mathematically validating the hardware-signed evidence that the object is now sequestered in the destination silicon. It is determined at step 550 whether the proof is verified. Upon a positive determination, the logic concludes by converting at step 554 the temporary state-lock into a permanent modification, updating the authoritative store to reflect that the state has been transitioned from the network environment to the hardware.

In a practical application of the Provisioning Logic Flow, consider the initial issuance of a digital asset from a central authority to a user's Sovereign Hardware Unit 110. The process facilitates a "zero-sum" transfer where the asset is logically transitioned to a new authority. Upon verifying at step 514 the unit's hardware certificate, the authority executes at step 526 a temporary state-lock on the record within the Authoritative Electronic Data Store 118. The resulting provisioning-payload is cryptographically bound at step 534 to the destination's unique hardware identity, restricting the manifestation of the value to the target silicon. This transition converts a remote database entry into a sequestered hardware state, requiring the unit to subsequently execute a rigorous entry protocol to verify the integrity of the incoming data, as detailed in the ingestion and verification process of FIG. 6.

Figure 6:
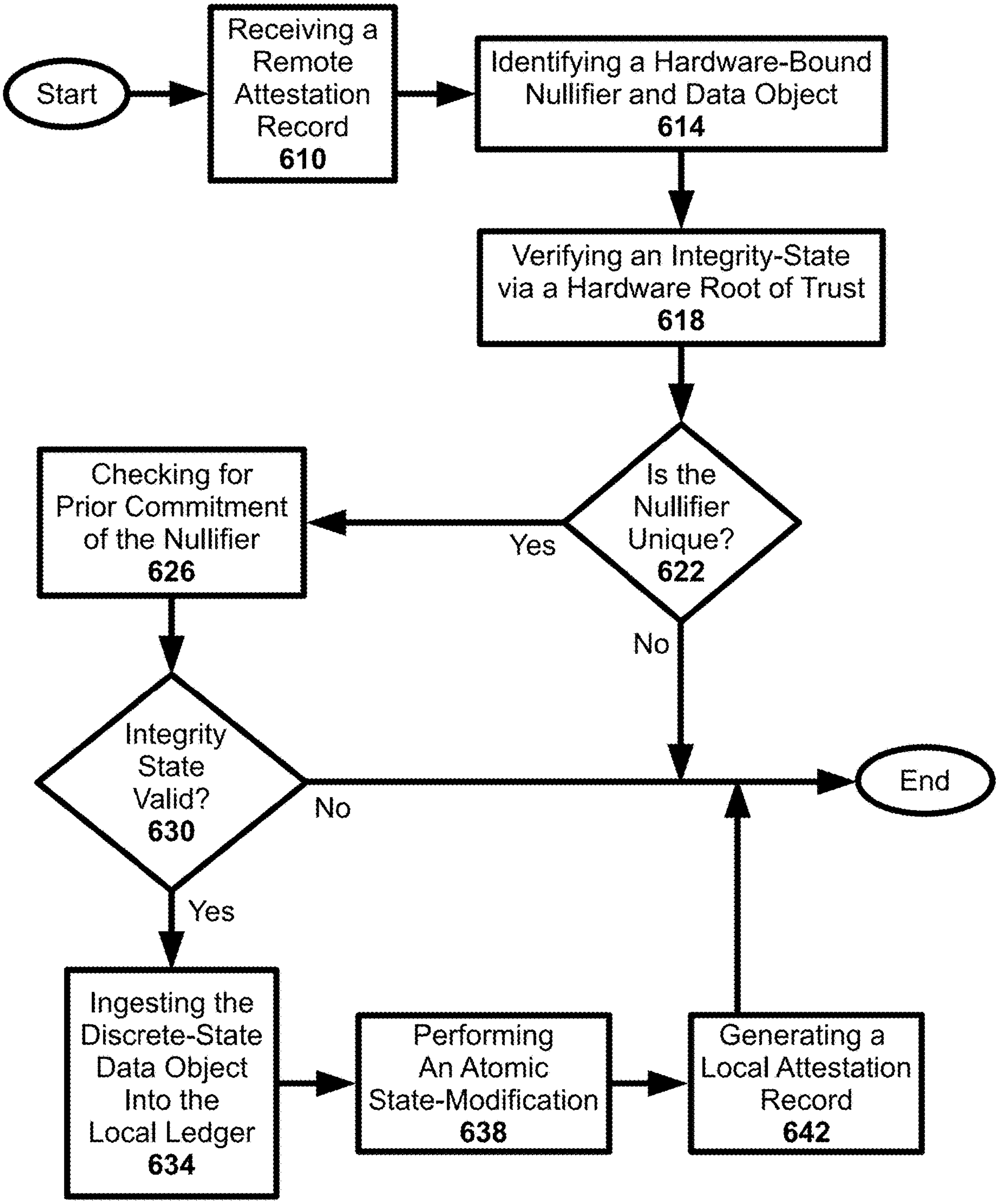
FIG. 6 is a flowchart illustrating the process for ingesting a discrete-state data object and verifying a hardware-bound nullifier in accordance with the present disclosure.

Referring to FIG. 6, the Ingestion and Verification Process is illustrated, detailing the logic flow for incorporating a remote data object into the local hardware ledger of the Sovereign Hardware Unit 110 (see FIG. 1). This process functions as a rigorous entry protocol, ensuring that any incoming state transition is legitimate and originated from a trusted source before it is granted access within the enclave. The process initiates with receiving at step 610 a remote attestation record from an external source via the Interface 230.

The sequence continues with identifying at step 614 a hardware-bound nullifier and data object from the received record, where the nullifier serves as a unique identifier for the specific state transition. The system then performs the step of verifying at step 618 an integrity-state via a hardware-root-of-trust, which involves checking the originating hardware's status, or the validity of the signed evidence, utilizing the Silicon Root of Trust 210 (see FIG. 2) using the Secure Execution Unit 242. It is determined at step 622 whether the integrity-state is valid. Upon a positive determination, the system proceeds to checking at step 626 for prior commitment of the nullifier by querying the Local Non-Volatile Ledger 218.

It is determined at step 630 whether the nullifier is unique. This check is configured to prevent replay attacks by verifying the specific security token has not been previously utilized within the system's logical constraints. Upon a positive determination, the process moves to ingesting at step 634 the discrete-state data object into the local ledger, specifically writing the data into the Hardware-Isolated Memory Partition 214.

To finalize the incorporation, the system performs the step of performing at step 638 an atomic state-modification (see FIG. 3), which transitions the ingested object into a sequestered, non-executable state. The logic concludes by generating at step 642 a local attestation record, which is placed in the Hardware Outbound-Queue 226 to facilitate external synchronization and provide evidence of the successful sequestration of the object within the local hardware.

In a practical application of the Ingestion and Verification Process, consider a user receiving a high-value digital payment. As the Sovereign Hardware Unit 110 receives the record at step 610, the HPEE 200 parses the payload to identify the hardware-bound nullifier at step 614. This nullifier acts as a unique digital fingerprint; the hardware checks the Local Non-Volatile Ledger 218 at step 626 to verify this identifier has not been previously committed. If the nullifier is unique at step 630, the hardware incorporates the value into the Hardware-Isolated Memory Partition 214. The result is that the user now possesses a verified asset that is restricted from unauthorized duplication by the hardware. This internal hardware verification establishes the baseline of local truth required to synchronize and reconcile the state with external data environments, as detailed in the interoperability logic of FIG. 7.

Figure 7:
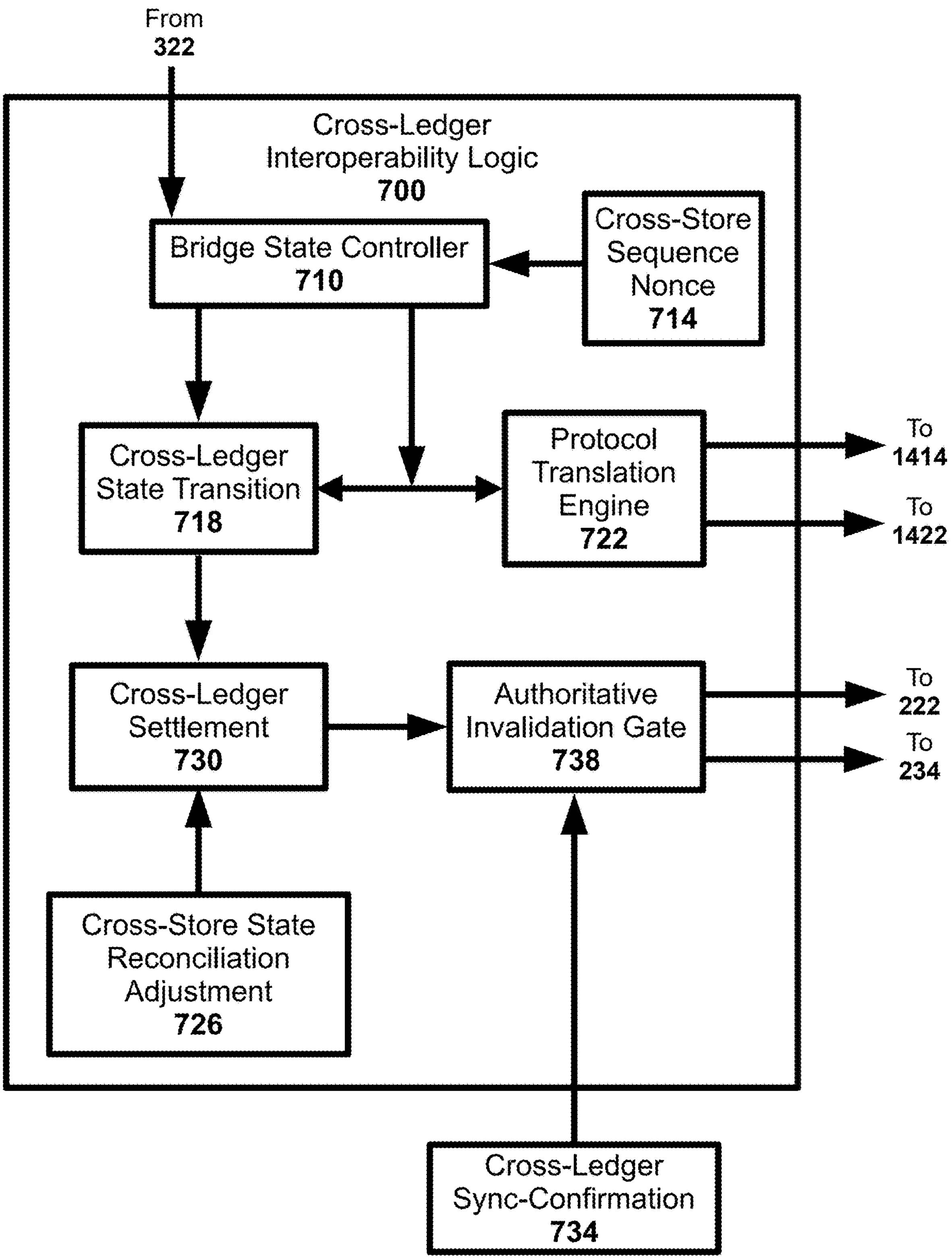
FIG. 7 is a functional block diagram representing cross-ledger interoperability, state reconciliation adjustments, and protocol-translation logic in accordance with the present disclosure.

Referring to FIG. 7, the Cross-Ledger Interoperability Logic 700 is illustrated, providing the functional grouping of modules and sequences required to enable state movement between distinct ledger environments. The Cross-Ledger Interoperability Logic 700 is architected to facilitate the recognition of a hardware sequestered state as a valid authority across varied external ecosystems, such as a Blockchain 1414 or a Centralized Authoritative Database 1422 (see FIG. 14). This logic is governed by a Bridge State Controller 710, which manages the lifecycle of Discrete State Data Objects 322 while they reside in a temporary, intermediate non-executable state during a transfer.

To maintain synchronization across disparate systems, the logic utilizes a Cross-Store Sequence Nonce 714. This unique numerical value is used once to mitigate replay attacks during the hand-off between two different data stores. The active process of shifting the object's governance is performed by the Cross-Ledger State Transition 718 module, which coordinates the movement of the state from one environment's ledger to another via the Secure Execution Unit 242. Facilitating this communication is a Protocol-Translation Engine 722, which is configured to provide a cryptographically verifiable attestation formatted for compatibility with the specific protocols required by the target external ledger and map scalar values to domain-specific attributes.

The system further manages the economic and administrative requirements of the transition through a Cross-Store State Reconciliation Adjustment 726, which serves as the requisite data anchor for defining balance or protocol-cost parameters. Upon completion of the technical exchange, the Cross-Ledger Settlement 730 module incorporates the values from the Cross-Store State Reconciliation Adjustment 726 to finalize the transaction between the two distinct systems. The logic then waits for a Cross-Ledger Sync-Confirmation 734, which is a signal received from the external data store indicating that its records are synchronized with the unit's internal state.

The final security checkpoint is the Authoritative Invalidation Gate 738. This logic gate is communicatively coupled to the Hardware State Machine 222 and the Hardware-Verified Lock-Bit 234 (see FIG. 2). Upon verified receipt of the synchronization signal, the Authoritative Invalidation Gate 738 triggers the voiding of the local state, restricting the object from being executable in both the Sovereign Hardware Unit 110 and the external ledger simultaneously.

In a practical application of the Cross-Ledger Interoperability Logic 700, FIG. 7 provides the technical mechanism for providing evidence to an external system that an asset has been locked in one database so it can be initiated in another environment. The Protocol-Translation Engine 722 converts the hardware-attested data into compatible formats, enabling the Bridge State Controller 710 to manage the asset's temporary, non-executable transition. Once the Authoritative Invalidation Gate 738 generates a cryptographic proof of local sequestration, the external ledger is configured to recognize the hardware unit as the authoritative source for that specific state. While this logic bridges distinct networks, the transfer of high-value states may require the verified participation of multiple independent authorizing entities, as detailed in the multi-party assembly of FIG. 8.

Figure 8:
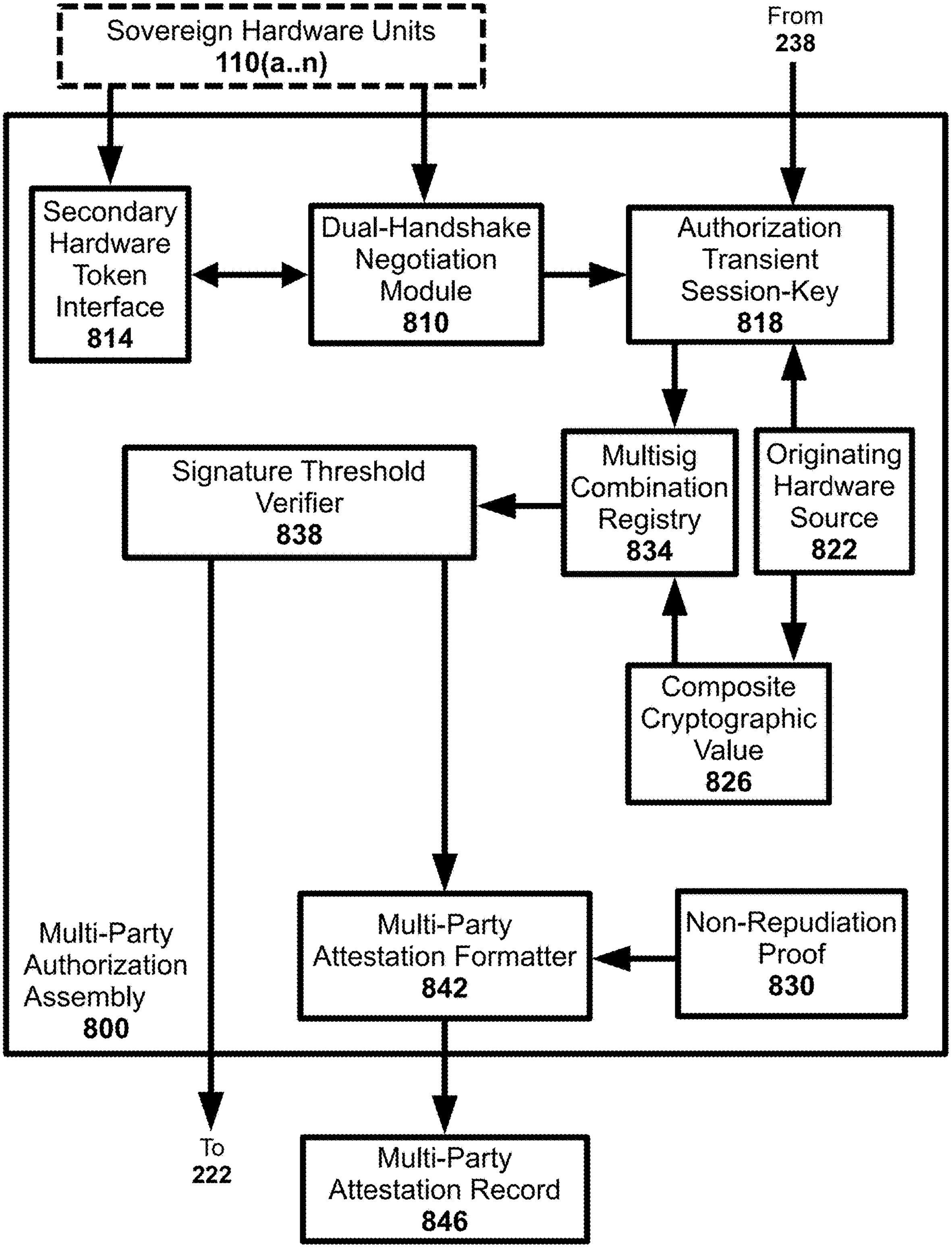
FIG. 8 is a block diagram representing the logic for a multi-party authorization assembly and the generation of a multi-party attestation record in accordance with the present disclosure.

Referring to FIG. 8, the Multi-party Authorization Assembly 800 is illustrated, comprising the physical and logical arrangement of components for collaborative state authorization. The Multi-party Authorization Assembly 800 is used to enforce a threshold of cryptographic inputs before the Hardware State Machine 222 (see FIG. 2) permits a modification to a sequestered state. This assembly includes a Dual-Handshake Negotiation Module 810 positioned within the HPEE 200, which functions as the hardware-bound peer-discovery logic to establish secure, authenticated links with other Sovereign Hardware Units 110(*a* . . . *n*).

Communication with these additional units is facilitated by a Secondary Hardware-Token Interface 814, which may comprise a physical port (e.g., USB, NFC, or ISO/IEC 7816) or a logical port. During an authorization sequence, the module generates an Authorization Transient Session-key 818, which is a temporary security key for destruction following the conclusion of a communication session. This key is governed by the Internal Hardware Clock 238 to ensure the session remains within a temporal window and is bound to the Originating Hardware Source 822 to verify the physical device where the data object was first created.

The Composite Cryptographic Value 826 serves as a complex security key derived from multiple independent data points—including identity data from the Originating Hardware Source 822—providing a Non-repudiation Proof 830. As signatures are collected, they are aggregated within a Multisig Combination Registry 834, a secure memory buffer. A Signature Threshold Verifier 838 is communicatively coupled to this registry and functions as a structural logic gate; it acts as a logic-gated comparator that evaluates the total registry count against pre-defined compliance rules to physically permit or deny state modification.

Upon reaching the threshold, a Multi-party Attestation Formatter 842 assembles the various cryptographic inputs into a single, unified Multi-party Attestation Record 846. This record provides evidence of the collaborative event, incorporating the Non-repudiation Proof 830 and a hardware-level Attestation Record 438 (see FIG. 4). By using multiple physical or logical "handshakes" at the silicon level, the assembly mitigates the risk of state transitions being executed by a single compromised entity.

In a practical application of the Multi-party Authorization Assembly 800, FIG. 8 acts as a guard against unilateral movement of high-value assets. The Signature Threshold Verifier 838 ensures that the HPEE 200 remains in a locked state until a consensus of signatures is reached. This architecture allows two or more Sovereign Hardware Units 110*a* . . . *n* to satisfy the same hardware logic gate before a transition is permitted. However, the risk of a process failure or a missing participant is mitigated by a standardized reversion protocol, as detailed in the recovery process of FIG. 9.

Figure 9:
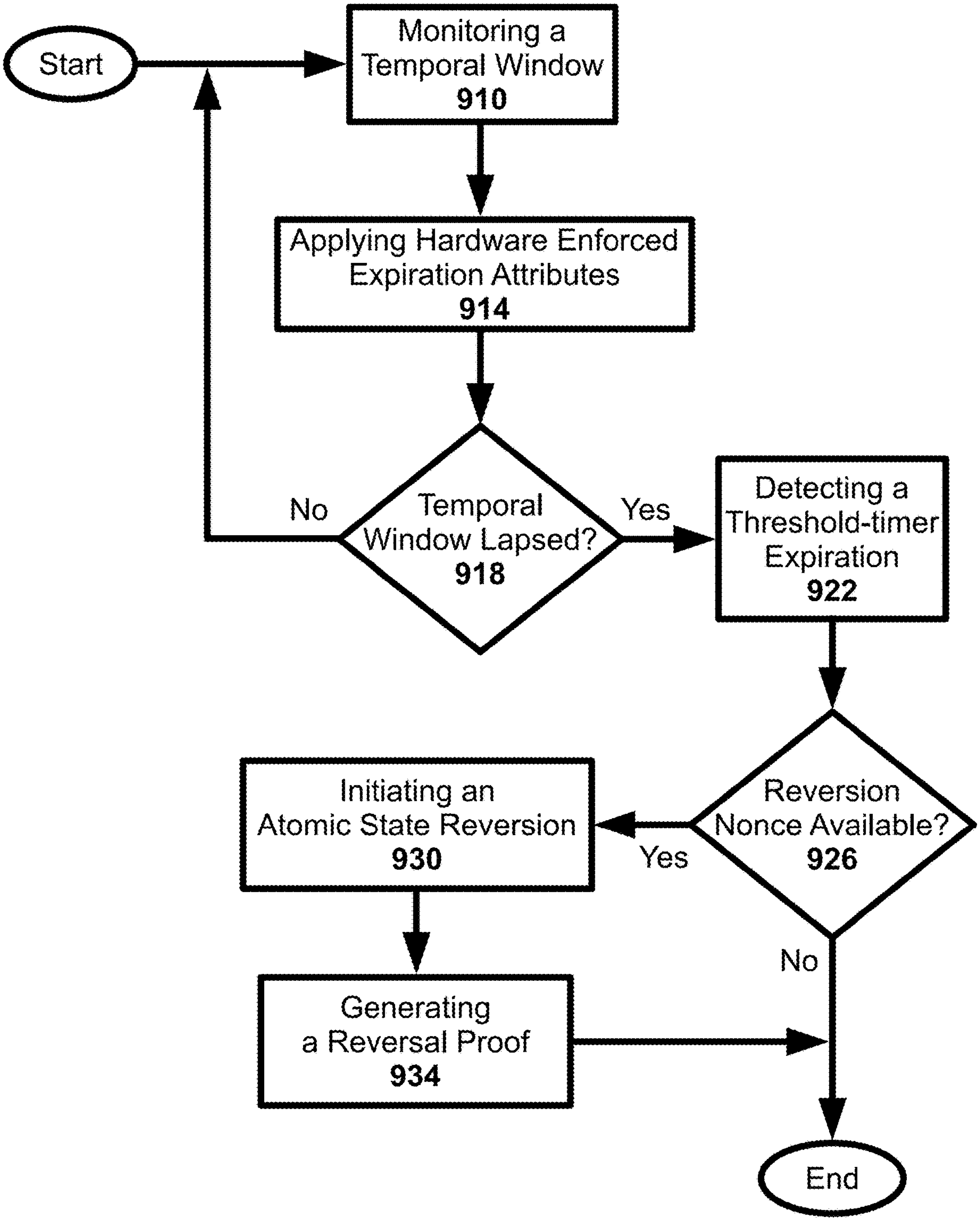
FIG. 9 is a flowchart illustrating a hardware-enforced recovery process governed by a temporal window and a reversion nonce in accordance with the present disclosure.

Referring to FIG. 9, the Hardware-Enforced Recovery Process is illustrated, detailing the automated logic for reverting a state change upon a detected failure or synchronization timeout. The Hardware-Enforced Recovery Process is configured to mitigate instances where a data object becomes inaccessible due to network interruptions between the Sovereign Hardware Unit 110 and the Authoritative Electronic Data Store 118. The process initiates with monitoring at step 910 a temporal window via the Internal Hardware Clock 238, which defines the specific duration allowed for a state synchronization event to conclude. During this window, the system performs the step of applying at step 914 hardware-enforced expiration attributes to the pending state, which may be temporarily held within the Shadow Ledger 430. It is determined at step 918 whether the temporal window has lapsed. If the allowed time expires without a confirmation signal, the logic proceeds to detecting at step 922 a threshold-timer expiration. This hardware-level signal, generated within the HPEE 200, triggers a logic check to verify the status of the pending transaction.

It is determined at step 926 whether a reversion nonce is available within the Hardware-Isolated Memory Partition 214. This nonce serves as a pre-authorized rollback code cryptographically tied to the specific transaction and the Hardware-Enforced Journaled Transaction 354. Upon a positive determination, the system moves to initiating at step 930 an atomic state-reversion. This step utilizes the Secure Execution Unit 242 and the Hardware State Machine 222 to undo the pending modification as a single logical operation, returning the data object to its previous valid state within the Local Non-Volatile Ledger 218. This reversion is supported by the Enclave Power Rail 246 to ensure completion even during primary system power fluctuations. The logic concludes by generating at step 934 a reversal-proof, which is a hardware-signed attestation record provided to external systems to confirm that the local state has been restored to its prior authoritative condition.

In a practical application of the Hardware-Enforced Recovery Process, FIG. 9 functions as a technical safety mechanism to manage errors during volatile network conditions. Consider a scenario where a user attempts to push a digital asset from their Sovereign Hardware Unit 110 back to an External Node 114, but the connection drops mid-transmission. The HPEE 200 monitors at step 910 a temporal window to ensure the asset does not remain in an indefinite state of transition. When the system detects at step 922 that the synchronization timer has expired, it utilizes the reversion nonce at step 926 to trigger an atomic state-reversion. This reclaims the Scalar Value 338 into the user's local ledger, reducing the risk of the asset being lost due to a failed handshake. This automated self-correction maintains the unit as the primary authoritative record, providing the hardware-signed evidence required for external systems to audit the finalized state, as detailed in the verification architecture of FIG. 10.

Figure 10:
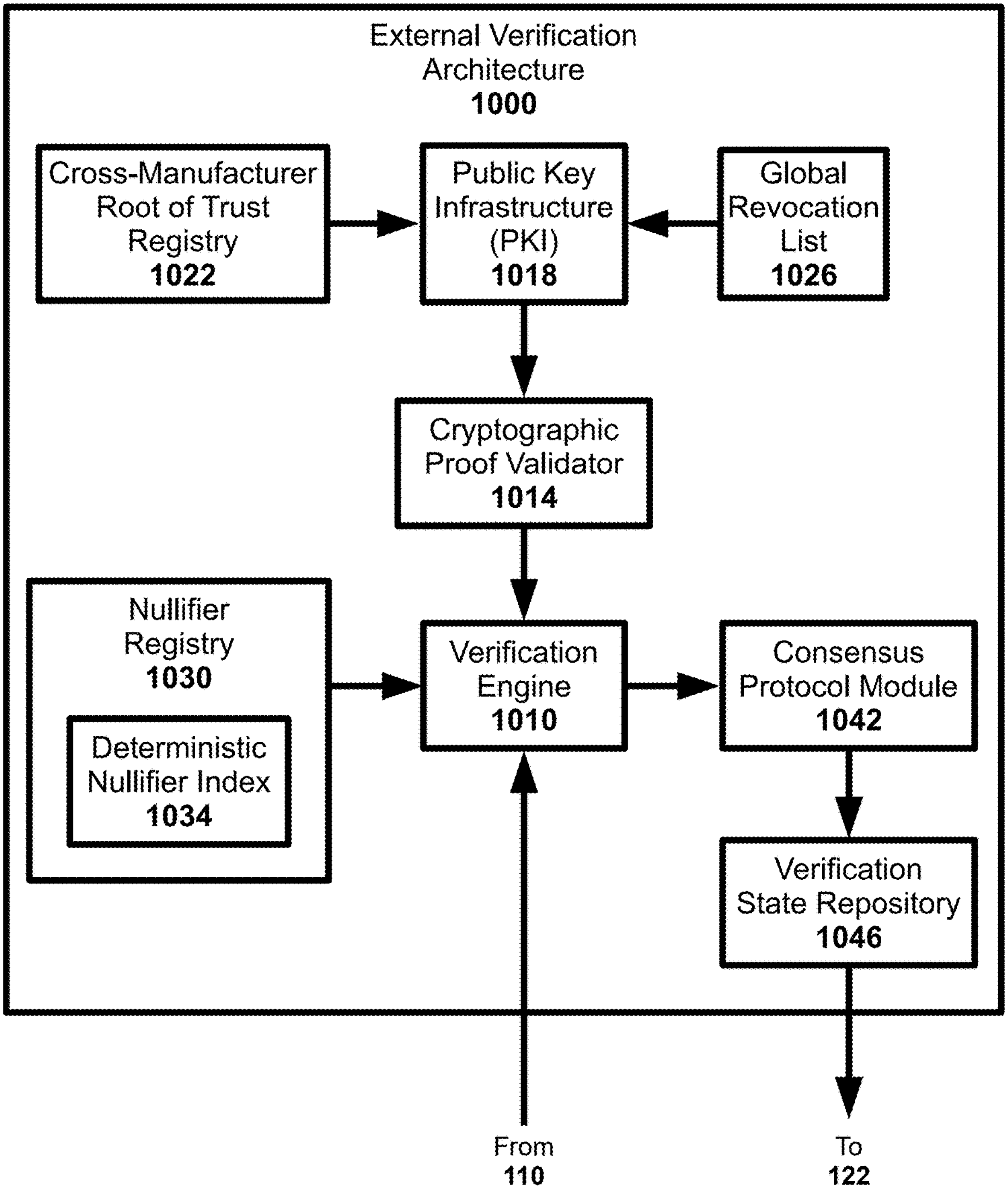
FIG. 10 is a block diagram representing an external verification architecture including a verification engine, a root of trust registry, and a nullifier-registry in accordance with the present disclosure.

Referring to FIG. 10, the External Verification Architecture 1000 is illustrated, providing the structural organization for validating unit-generated data within a Distributed Electronic Data Store 122. This architecture allows the external network to verify the integrity of a transaction without requiring access to the unit's internal private keys. At the core of this system is the Verification Engine 1010, which serves as the primary logic unit for processing incoming Attestation Records 438 received from the Hardware Outbound-Queue 226 or the Ledger Outbound-Queue 434 (see FIG. 2 and FIG. 4).

The Verification Engine 1010 utilizes a Cryptographic Proof Validator 1014 to mathematically verify the hardware integrity signatures attached to each record. This validation is supported by a Public-key Infrastructure (PKI) 1018, which manages the digital certificates required to identify the originating Sovereign Hardware Unit 110. To facilitate broad compatibility, the system includes a Cross-Manufacturer Root of Trust Registry 1022, a database configured to allow the engine to verify hardware produced by different vendors. Before a record is accepted, the engine cross-references the Global Revocation List 1026 to check that the specific hardware ID has not been flagged as compromised.

To prevent the reuse of digital assets, the architecture employs a Nullifier-Registry 1030. This component tracks used security tokens using a Deterministic Nullifier Index 1034, which provides a lookup structure for hardware-bound nullifiers to ensure they are not utilized more than once. The Verification Engine 1010 parses the Monotonic Sequence Nonce 418 embedded within the record to verify that the incoming data is processed in the correct chronological order. Once a record is validated, the Consensus Protocol Module 1042 manages the synchronization of the new state across network nodes. The verified state is then committed to the Verification State-Repository 1046, which provides a storage layer for independent auditing of the attestation logs.

In a practical application of the External Verification Architecture 1000, FIG. 10 serves as the authoritative external record that allows the network to trust the hardware's state. By utilizing the Verification Engine 1010, an external entity can mathematically confirm that a transaction originated from a genuine, untampered HPEE 200. The system checks the Nullifier-Registry 1030 to ensure the asset hasn't been double-spent, relying on the silicon's self-verifying proof. This shift creates a system where the public ledger records the proofs issued by the hardware. However, to bridge the gap between this digital logic and physical reality—such as verifying a user's presence via biometrics—the system requires specialized entry gates to parse external signals, as detailed in the logic of FIG. 11.

Figure 11:
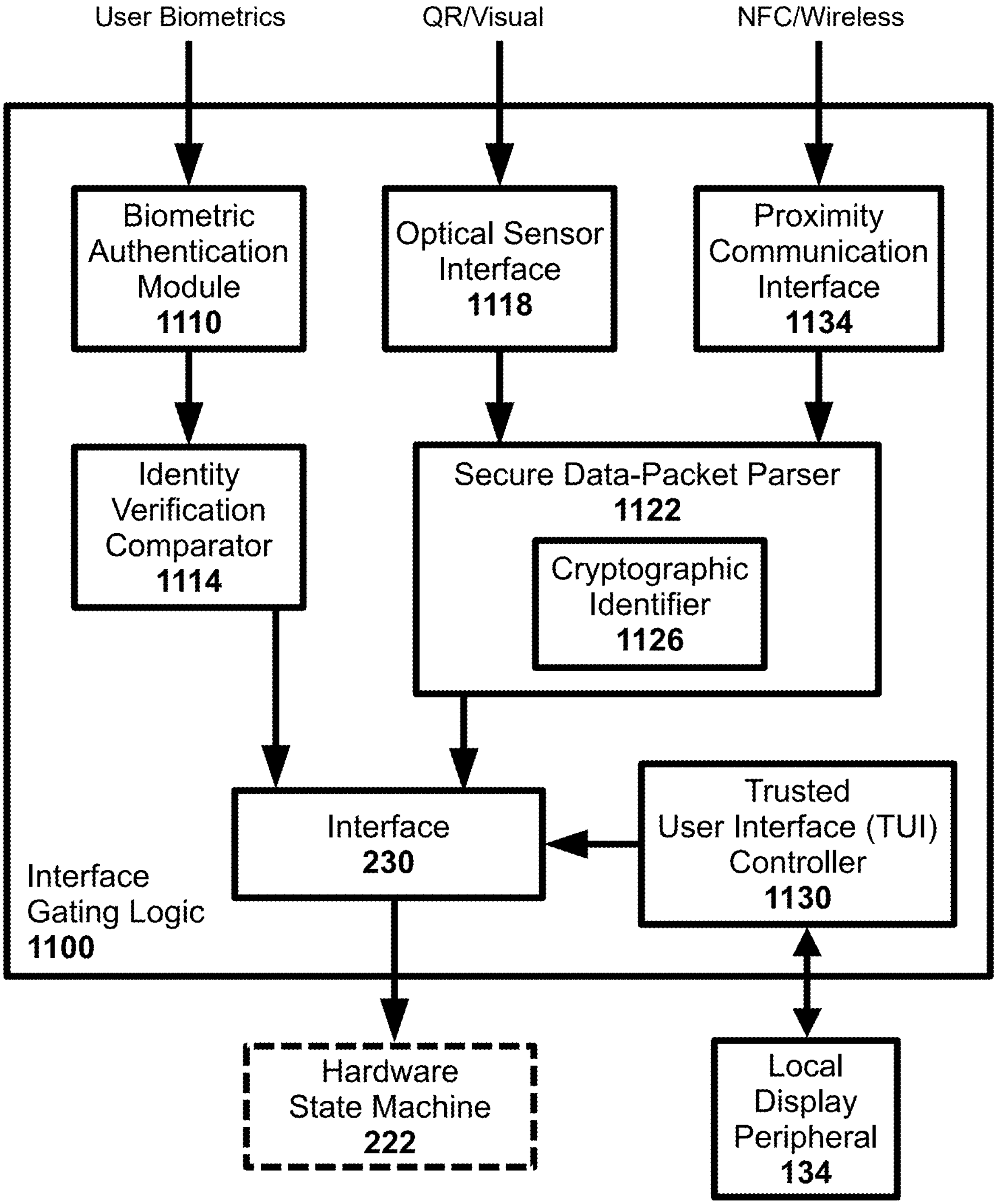
FIG. 11 is a functional block diagram representing the interface gating logic driven by a biometric authentication module and an optical sensor parser in accordance with the present disclosure.

Referring to FIG. 11, the Interface Gating Logic 1100 is illustrated, comprising the functional grouping of modules that manage secure access to the HPEE 200 based on external physical and digital inputs. This architecture serves as a secure entry point, configured to ensure that state transitions within the silicon are triggered only by verified, authorized signals directed to the Hardware State Machine 222 via the Interface 230. At the frontline of this logic is the Biometric Authentication Module 1110, which processes physical identity characteristics via the Secure Execution Unit 242 to bind the hardware's actions to a specific user.

The Biometric Authentication Module 1110 utilizes an Identity-Verification Comparator 1114 to match live biometric data against templates secured within the Hardware-Isolated Memory Partition 214, thereby establishing the necessary logical authorization for the Hardware State Machine 222 to proceed with a modification. For processing external data payloads from non-sequestered device peripherals, the system includes an Optical Sensor Interface 1118 and a Proximity Communication Interface 1134. The Optical Sensor Interface 1118 captures visual signals, while the Proximity Communication Interface 1134 manages wireless handshakes such as NFC, RFID, or modulated proximity signals. This data is fed into a Secure Data-Packet Parser 1122, which extracts the Cryptographic Identifier 1126 required to recognize a specific transaction before passing the authorization through the sequestered logic of the Interface 230 to the Hardware State Machine 222. In a marketplace application, these interfaces are configured to ingest and parse data from a plurality of sources including, but not limited to, QR codes, high-density matrix barcodes, or wireless proximity tokens.

Crucially, the Interface Gating Logic 1100 is governed by a Trusted User Interface (TUI) Controller 1130. This controller manages the Local Display Peripheral 134 and an input path that is architecturally sequestered from the Primary Operating System 130, mitigating risks associated with unauthorized screen access. This isolation ensures that when a user approves a state-modification, the interaction occurs directly with the HPEE 200. Furthermore, the gating logic includes sensors configured to detect unauthorized physical access; if a physical breach of the unit casing is detected, the Interface Gating Logic 1100 triggers a state-invalidation protocol while simultaneously issuing an Attestation Record 438—providing evidence that the state was invalidated during a valid possession period, enabling external recovery via the Authoritative Electronic Data Store 118.

In a practical application of the Interface Gating Logic 1100, FIG. 11 provides a defense mechanism configured to protect the value of an asset even if the hardware is physically compromised. If the unit detects a breach, the TUI Controller 1130 and associated sensors trigger a final hardware-signed receipt before the internal state is invalidated. This logic transforms a potential loss into a verifiable claim that the user can provide to an Authoritative Electronic Data Store 118. By bridging the physical status of the unit to the digital evidence in the ledger, the system enables secure commerce even where the unit must act as a temporary messenger, as detailed in the connectivity architecture of FIG. 12.

Figure 12:
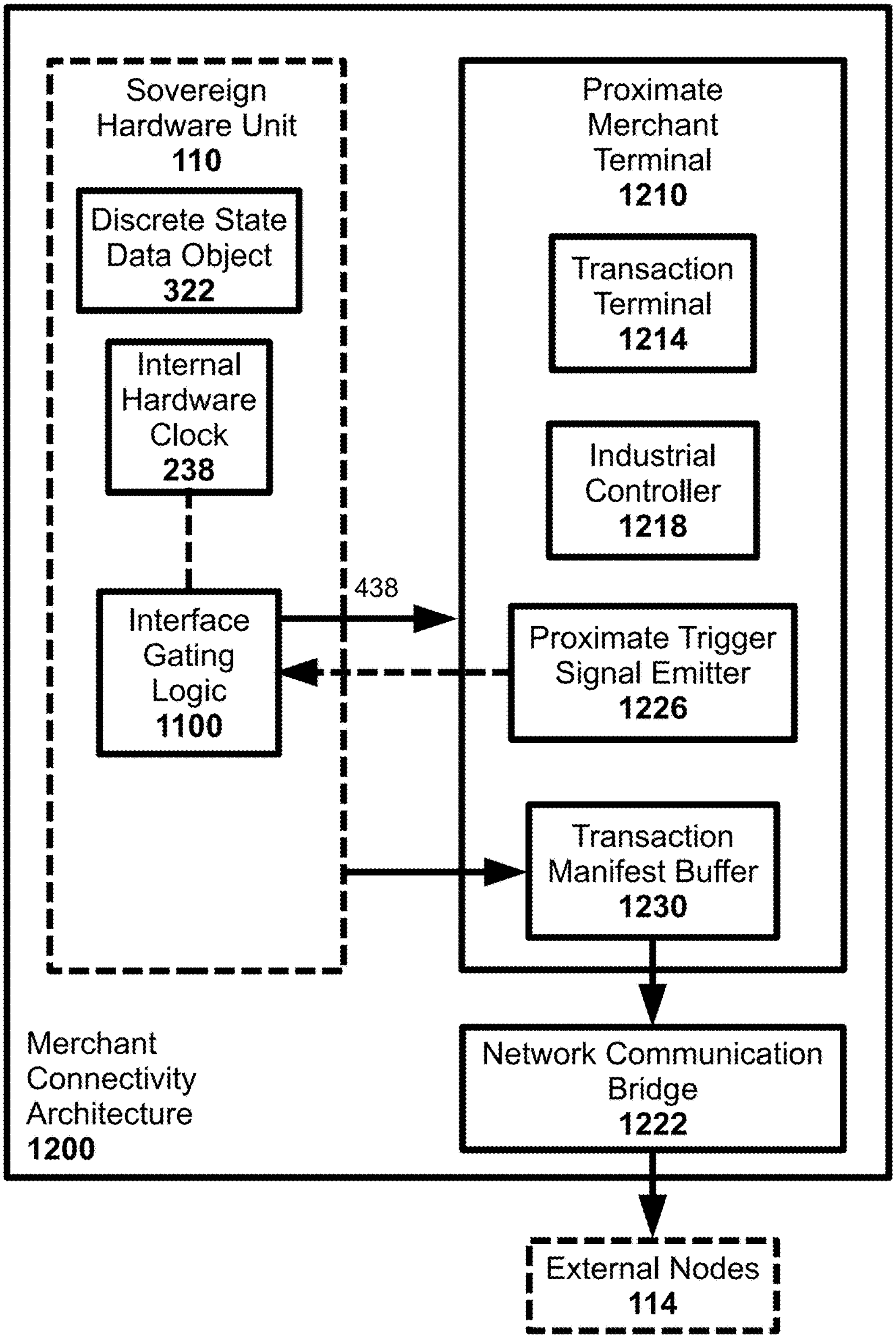
FIG. 12 is a block diagram representing merchant connectivity between a device and a proximate transaction terminal acting as a communication bridge in accordance with the present disclosure.

Referring to FIG. 12, the Merchant Connectivity Architecture 1200 is illustrated, depicting the structural arrangement of a unit and terminal acting as a secure bridge for state-transfer in environments with limited connectivity. This architecture enables localized commerce where a transaction can be finalized between two local hardware units without requiring a continuous real-time link to a central network. The primary interface for this interaction is the Proximate Merchant Terminal 1210, which acts as a localized gateway for the Sovereign Hardware Unit 110.

The Proximate Merchant Terminal 1210 may be embodied as a Transaction Terminal 1214 or an Industrial Controller 1218. To initiate the secure handshake, the terminal utilizes a Proximate Trigger Signal Emitter 1226, which broadcasts a local signal to wake the Interface Gating Logic 1100. This process is governed by the Internal Hardware Clock 238 to ensure the proximity signal is valid within a specific temporal window. Once a connection is established, the Network Communication Bridge 1222 provides a logical data path that routes hardware-signed attestations from the enclave to the External Nodes 114, effectively functioning as a relay for units lacking an independent wide-area link.

To manage offline settlement, the terminal includes a Transaction-Manifest Buffer 1230. This structural memory region stores the proposed state changes and the resulting hardware proofs before they are relayed to the wider network. By utilizing the terminal as a messenger, the system ensures that the Discrete State Data Object 322 can be transitioned even if the Sovereign Hardware Unit 110 lacks a direct internet connection. The terminal facilitates the passage of the Attestation Record 438, which carries the hardware-verified authority of the silicon.

In a practical application of the Merchant Connectivity Architecture 1200, FIG. 12 enables secure commerce in areas where network service is unavailable. The Proximate Merchant Terminal 1210 serves as a temporary bridge, allowing the Sovereign Hardware Unit 110 to pass a hardware-signed proof of payment through the station's own communication link. In industrial embodiments, the Industrial Controller 1218 ensures that high-value state-modifications can only be executed when the HPEE 200 is in physical proximity to the controller. This localized, peer-to-peer finality is highly secure but must scale to handle high throughput, a requirement addressed by the high-volume stacking logic of FIG. 13.

Figure 13:
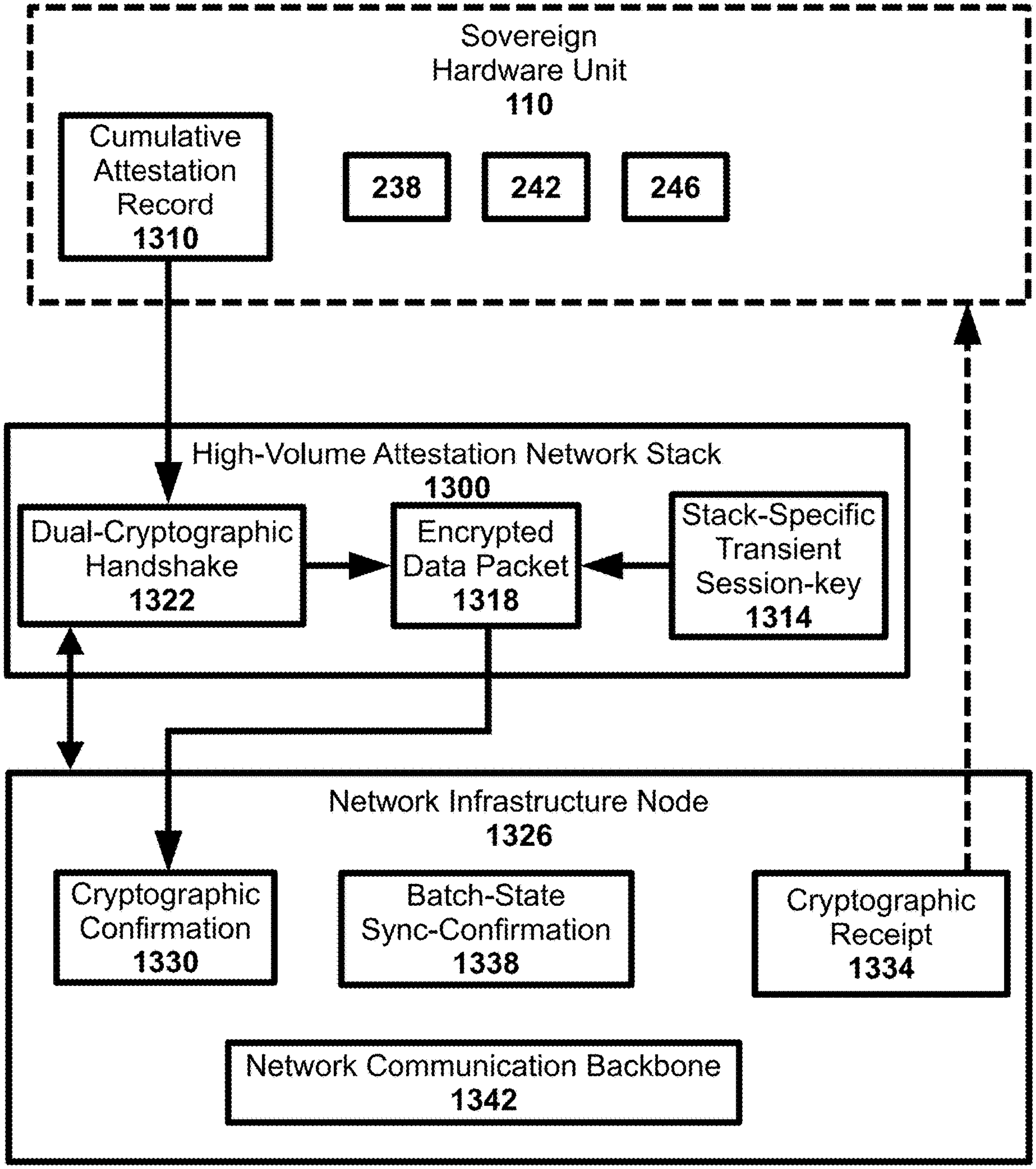
FIG. 13 is a functional block diagram representing a high-volume attestation network stack utilizing cumulative attestation records and transient session-keys in accordance with the present disclosure.

Referring to FIG. 13, the High-Volume Attestation Network Stack 1300 is illustrated, representing the architectural layer configured to manage bulk data transmission between the Sovereign Hardware Unit 110 and the broader network. This stack functions as a high-capacity egress for the system, configured to ensure that the hardware-bound security logic maintains transaction throughput. To facilitate scalability, the system utilizes a Cumulative Attestation Record 1310, which batches multiple individual hardware events into a unified data structure prepared by the Secure Execution Unit 242, effectively compressing the overhead required for multiple sequential signatures into a single verifiable unit.

The transmission process begins with a Dual-Cryptographic Handshake 1322, a two-way verification that requires signatures from both the unit and the Network Infrastructure Node 1326 to establish a secure communication path. Within this path, data is protected as an Encrypted Data Packet 1318, keyed by a Stack-Specific Transient Session-key 1314. This key is governed by the Internal Hardware Clock 238 to enforce strict session expiration and is destroyed following use to maintain forward secrecy.

As the Network Infrastructure Node 1326 ingests the data, it issues a Cryptographic Confirmation 1330. This is followed by a Cryptographic Receipt 1334, which is provided to the Hardware Outbound-Queue 226 or the Local Non-Volatile Ledger Architecture 400 to update the local record, providing the final confirmation required for the ledger to mark the batch as successfully transmitted. The process concludes when the node provides a Batch-State Sync-Confirmation 1338, signaling that the external state has been updated across the Network Communication Backbone 1342. This batching logic is supported by the Enclave Power Rail 246 to ensure that large batch signings are not interrupted by external power fluctuations.

In a practical application of the High-Volume Attestation Network Stack 1300, FIG. 13 provides the scalability required to handle high-throughput transaction volumes while maintaining the integrity of the HPEE 200. By utilizing the Cumulative Attestation Record 1310, the system reduces network overhead by grouping multiple secure settlements into a single, signed transmission. This logic facilitates the transition of assets from cloud-control to hardware-sequestration on a global scale. To ensure these settlements are recognized by various financial institutions, the system utilizes a universal mapping layer to bridge different database architectures, as detailed in the interface logic of FIG. 14.

Figure 14:
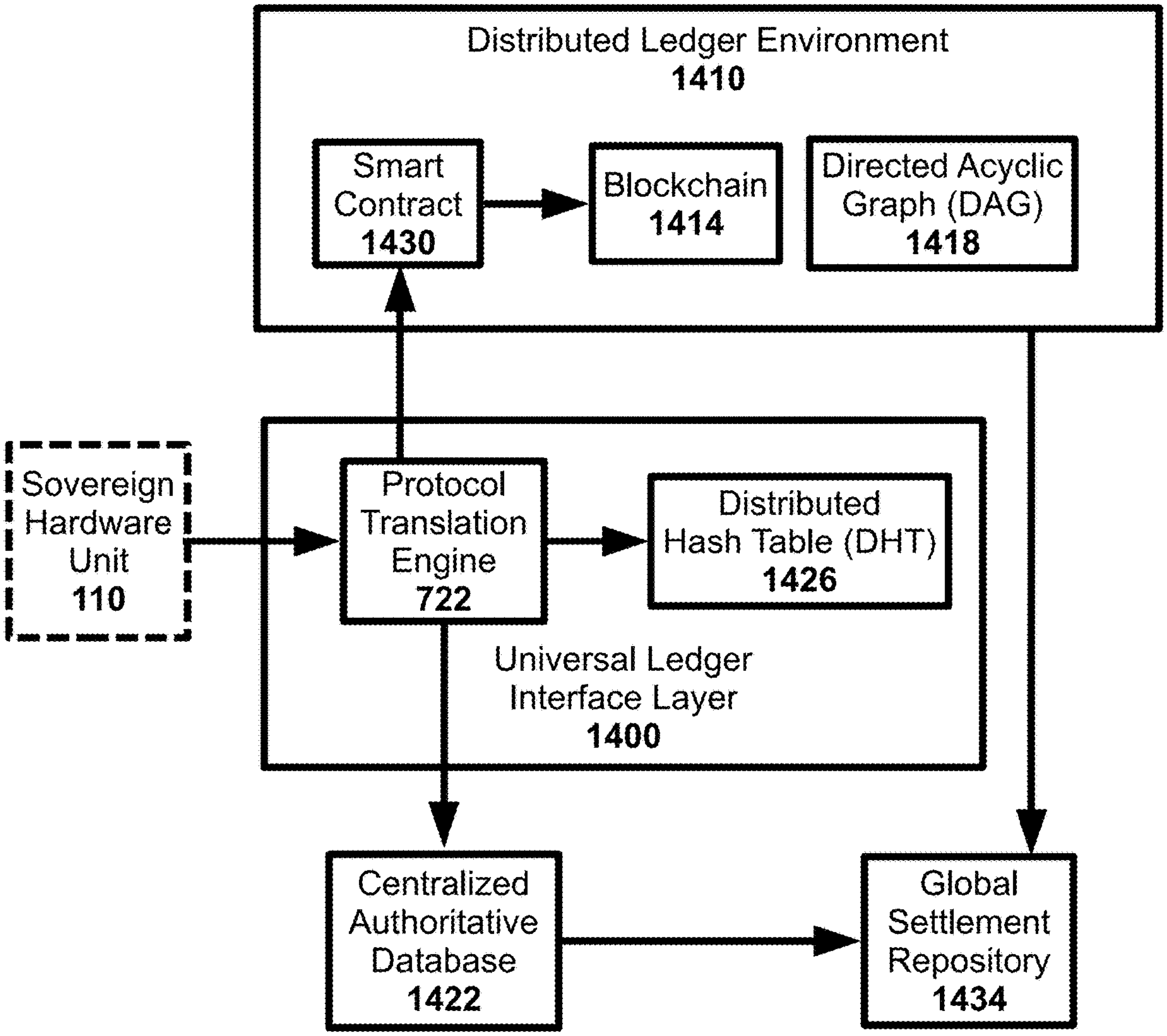
FIG. 14 is a block diagram representing a universal ledger interface layer mapping hardware states to a plurality of external data store environments in accordance with the present disclosure.

Referring to FIG. 14, the Universal Ledger Interface Layer 1400 is illustrated, providing the functional mapping required to synchronize the sequestered hardware state with a variety of external database architectures. This layer ensures that the state finality achieved within the Sovereign Hardware Unit 110 is recognized by external systems of record. The layer utilizes the Protocol-Translation Engine 722 (see FIG. 7) to provide a cryptographically verifiable attestation formatted for compatibility with domain-specific attributes derived from Attestation Records 438 and their associated Monotonic Sequence Nonces 418, ensuring that the enclave's internal chronological record is translated into a format the external target can ingest.

The architecture is configured to communicate with a Distributed Ledger Environment 1410, which may include a Blockchain 1414 or a Directed Acyclic Graph (DAG) 1418. For blockchain-based systems, the interface utilizes a Smart Contract 1430 to automate state updates based on the hardware-signed proofs received from the unit. Additionally, the layer includes a Distributed Hash Table (DHT) 1426 for state discovery across decentralized nodes.

To bridge the gap with traditional data systems, the interface also maps states to a Centralized Authoritative Database 1422. This ensures that the Scalar Value 338 held in silicon can be reconciled with legacy account structures, effectively providing the functional bridge for systems—including banking mainframes, corporate ERP systems, or medical EHR registries—to recognize the hardware enclave as a source of truth. All verified transitions are recorded in the Global Settlement Repository 1434, providing a transparent audit trail that may be reconciled with the Verification State-Repository 1046 (see FIG. 10). By translating the unified hardware state into these varied protocols via the Secure Execution Unit 242, the system facilitates state consistency across disparate technologies.

In a practical application of the Universal Ledger Interface Layer 1400, FIG. 14 provides the mapping that allows disparate systems, such as a legacy banking mainframe and a modern blockchain, to synchronize with the user's hardware. By mapping the sequestered state across the Centralized Authoritative Database 1422 and the Blockchain 1414, the system ensures that when an asset is sequestered in silicon, it is recognized as settled across the external ecosystem. This ensures that the user's physical Sovereign Hardware Unit 110 remains the primary authoritative record for the sequestered state.

The hardware sequestered machine-state system described herein is not limited to the specific financial transaction embodiments illustrated in the figures. As used in this disclosure, a Discrete State Data Object 322 may represent any unit of information requiring hardware-governed finality, including but not limited to cryptographic keys, identity credentials, medical records, or industrial set-points. The Local Non-Volatile Ledger Architecture 400 may be implemented across various hardware architectures, such as a discrete secure element, a trusted execution environment (TEE) integrated into a system-on-chip (SoC), or a dedicated hardware security module (HSM). Furthermore, the Atomic State-Modification Logic 300 processes may be executed in an order other than that described, and the logical isolation of the HPEE 200 from the primary operating system may be achieved through physical circuit separation, hypervisor-based partitioning, or cryptographic memory encryption.

While the management of the hardware sequestered machine-state is described in certain embodiments as facilitating financial settlement, the structural logic of the system is configured for the sequestration of digital assets requiring high-integrity finality and hardware-governed possession. In the context of Sovereign Identity and Liveness Credentials, the Discrete State Data Object 322 functions as a sequestered "Right-to-Act" (e.g., a voting credit or a controlled-access permission) provisioned into the HPEE 200 from a government or institutional Authoritative Electronic Data Store 118. The system is configured to manage a state transition wherein the identity object is moved from a Non-Executable State 334 to an Executable State 326 upon a hardware-verified biometric match via the TUI Controller 1130. This logic couples the liveness of the user to the utility of the credential, providing that the sovereign identity is not exercised or replicated without a Hardware-Signed Instruction 314 originating from the Sovereign Hardware Unit 110.

In Critical Infrastructure and Industrial Command-and-Control, the system manages instruction sequestration. The Discrete State Data Object 322 comprises a cryptographic set-point or enablement-key for a power grid, satellite, or autonomous vehicle system that is held in a Non-Executable State 334 within the Local Non-Volatile Ledger Hardware 218. This configuration is designed to protect critical infrastructure from remote network injection attacks, as the logic required for operation is sequestered from the network. The activation of the system-allowing the Industrial Controller 1218 to move a physical actuator or open a circuit-requires the hardware-enforced transition of the object to an Executable State 326, a process that may be gated by a Multi-party Authorization Assembly 800. This reduces "Master Admin" vulnerabilities in the cloud by placing the authority for physical movement into a sequestered silicon enclave that requires authenticated presence to enable utility.

The architecture further extends to Intellectual Property and Digital Originality, where the Discrete State Data Object 322 functions as a digital original. In this embodiment, the object may represent the weights of a proprietary AI model, a high-value media asset, or a digital twin of a physical luxury item. By utilizing the Ingestion and Verification Process of the HPEE 200, a user achieves possession of the executable version of a digital file. When this object is transferred peer-to-peer—utilizing the Dual-Cryptographic Handshake 1322 and the generation of a joint attestation record—the asset is invalidated on the sender's silicon via Atomic State-Modification Logic 300 as it is initialized on the receiver's. This creates hardware-governed scarcity for digital media, allowing for the offline ownership and trade of digital property via the Universal Ledger Interface Layer 1400. Within this layer, the Protocol-Translation Engine 722 ensures that the hardware sequestered Scalar Value 338 is mapped to domain-specific attributes required for the target industry's protocol.

Finally, in the field of Biomedical Data Sovereignty, the system enables the sequestration of a user's genomic or sensitive medical records. The Discrete State Data Object 322 in this scenario is a sequestered decryption key or a pointer to a fragmented medical record. A medical provider is provided a temporary state-lock on the object to enable data utility for a specific clinical window. Once the Temporal Window 910 lapses or the hardware-enforced expiration attribute is triggered, the HPEE 200 initiates an Atomic State-Reversion 930 to return the key to a Non-Executable State 334, revoking the utility of the record without requiring a command from a Centralized Authoritative Database 1422. This configuration ensures that the user remains the physical custodian of their biological information, with the silicon serving as the primary record of when and for how long the data remains in an executable state.

It is further contemplated that the storage capacity and computational throughput of the HPEE 200 will scale in accordance with advancements in three-dimensional logic stacking and heterogeneous integration. Future embodiments of the Local Non-Volatile Ledger Hardware 218 may utilize high-density, Through-Silicon Via (TSV) architecture to sequester large-scale Discrete State Data Objects 322. This enables the sequestration of entire data sets-such as the localized weights of an artificial intelligence model or a complete genomic sequence-directly within the silicon. By managing these datasets through the Atomic State-Modification Logic 300, the system ensures that the hardware remains the primary gatekeeper of state transitions, maintaining the enforcement of Executable States 326 and Non-Executable States 334 regardless of the total data volume sequestered.

The following disclosure provides additional details regarding the diverse technical configurations and alternative embodiments of the hardware-sequestered machine-state system. While the primary device facilitates the management of a sequestered state through a hardware-protected execution environment (HPEE) and local non-volatile ledger, the specific nature of the discrete-state data object and the resulting attestation record may vary according to operational requirements. In certain embodiments, the discrete-state data object is associated with a designated originating entity, such that the self-verifying instruction contained within the attestation record is specifically addressable to an external node—such as a transaction terminal, mobile computing device, industrial controller, or network infrastructure node—to effectuate the synchronization of an external electronic data store managed by that entity. This data store may be implemented as a distributed ledger, a centralized banking database, or even the hardware-protected ledger of a peer device. To ensure absolute integrity during the transition into a non-executable state, the HPEE may sequester the object so it remains locally recoverable but non-executable until a cryptographic confirmation of synchronization is received. Furthermore, the HPEE can establish non-repudiation proof independent of the primary data store by transmitting the attestation record to a publicly-verifiable state-repository, such as a third-party blockchain, directed acyclic graph (DAG), or distributed hash table (DHT), allowing the external electronic data store to verify synchronization against evidence persisted on an immutable public layer.

The relationship between the hardware identity and the data objects it manages is further refined through strict cryptographic binding and scalar logic. The attestation record may be bound to a unique hardware-attested identity of the HPEE, and the transition of a data object between states may correspond to an ingestion or eviction process that modifies an executable scalar value within the local ledger. For instance, an ingestion may occur in response to a state-reduction within an authoritative electronic data store, effectively moving value into the device. To protect against network failures, the non-executable state may function as a temporary sequestered state subject to hardware-enforced expiration; if a synchronization confirmation is not received via the interface within a defined temporal window, the HPEE autonomously reverts the object to its executable state. Alternatively, the system may perform a secondary atomic modification to extinguish the object from the non-executable state, rendering the transition irrevocable once proof of its recording on a public repository is verified. The HPEE may even purge the record entirely from the local ledger only upon verifying a cryptographic receipt confirming that the external state is fully synchronized.

The structural composition of the attestation record and the gating mechanisms of the HPEE provide granular control over state-modifications. The self-verifying instruction may be a structural data object comprising the hardware identity, a sequence nonce, a scalar value, and a destination identifier, all of which are cryptographically bound together. Atomic state-modifications may be triggered by hardware-verified events such as biometric authentication, proximity-based NFC handshakes, or the expiration of a threshold-timer. The non-executable state itself may be further defined as a revocable-escrow state—subject to hardware-signed cancellation—or a final-eviction state where the object is cryptographically shredded immediately following the generation of the attestation record. To survive power loss, the persistence of the attestation record is maintained across power-cycling events until a verified acknowledgment is received. This reconciliation ensures the external store updates its remote state to mirror the local transition, while the HPEE generates specific proofs of capture, synchronization, or eviction to define a hardware-verified lock on the data object.

Connectivity and secure session management extend the utility of the device into offline and peer-to-peer environments. The interface may establish mutually authenticated secure sessions for asynchronous transmission, and the atomic modification may include decrypting received encrypted data packets within the HPEE. The attestation record functions as a non-repudiable, hardware-signed instruction to synchronize external stores, while specialized tamper-attestation records are generated if a physical hardware-tamper event is detected. For high-volume environments, an outbound-queue buffers multiple records—each assigned a monotonic sequence nonce—for sequential transmission. Access to these modifications can be gated by a Trusted User Interface (TUI) logically isolated from the primary operating system, or require a deterministic nullifier to ensure the object is permanently spent. Complex authorizations may also require co-signing signatures from secondary hardware-tokens or involve dual-cryptographic handshakes to generate joint attestation records for peer-to-peer settlement, allowing the device to function as a self-contained node independent of wide-area network connectivity by using proximate merchant terminals as data bridges.

The system further ensures hardware-level reliability through pre-computation and autonomous recovery logic. The HPEE may enforce expiration attributes to automatically invalidate entries and generate reversal-proofs if a transition is not completed, or it may partition a primary data object into sub-units with unique digital signatures. Atomic state-modifications may be implemented as simultaneous state-overwrites that shred the object and persist the record, preventing the recovery of intermediate states. Advanced ledger management may utilize both a primary and a shadow ledger to defer modifications until cryptographic acknowledgments are verified, with the attestation record identifying any divergence-state. The HPEE is also capable of monitoring scalar value attributes to detect sub-threshold states and autonomously initiating secure sessions to ingest supplemental objects as defined by a manifest. Cross-ledger transitions can be initiated in response to proximate trigger signals, maintaining a bridge-state within the HPEE that is verified by a hardware-root-of-trust without reliance on centralized oracles.

Finally, the verification and ingestion of remote state-modifications ensure the integrity of the broader ecosystem. The HPEE may perform atomic ingestions where the persistence of a data object and the cryptographic invalidation of a remote record occur simultaneously. Local attestation records serve as proof of sequestration, with integrity-state verification performed against a hardware manufacturer's public-key infrastructure (PKI). The HPEE prevents replay attacks by rejecting records if the nullifier matches an entry in a local cache or a global revocation list. Aggregated data objects update local scalar values, and cross-ledger settlements are finalized by transmitting verification-receipts to distinct data stores. Rejection-attestations are persisted to prevent subsequent attempts on invalid data, and machine-readable visual codes can be used to ingest records via an optical sensor. The device can transition from low-power listening to active verification upon detecting unsolicited broadcasts, and it may enforce hardware-signed expirations, co-signing requirements, or verification-windows based on hardware-attested timestamps to maintain local ledger hygiene and security.

Having described the technical architecture and functional logic of the present disclosure in detail, it is intended that the scope of the disclosure be defined by the claims appended hereto, and that all modifications, equivalents, and variations that fall within the spirit and scope of the disclosure be included therein. The use of specific terminology and numbering is intended to provide clarity and does not preclude the application of the broadest reasonable interpretation of the elements as defined in the summary, the introductory definitions, and the specific embodiments described herein.

Although the disclosure has been shown and described with respect to certain aspects or embodiments, equivalent alterations and modifications will occur to others skilled in the art upon the reading and understanding of this specification and the annexed drawings. In particular regard to the various functions performed by the above-described items referred to by numerals (components, assemblies, modules, etc.), the terms (including a reference to a "means") used to describe such items are intended to correspond, unless otherwise indicated, to any item which performs the specified function of the described item (e.g., that is functionally equivalent), even though not structurally equivalent to any exemplary structure which performs the function in the herein illustrated exemplary aspects of the disclosure. Such items shall be understood to include any combination of hardware, firmware, or machine-executable instructions (software) configured to perform the recited functions.

In addition, while a particular feature of the disclosure may have been described above with respect to only one of several illustrated aspects, such feature may be combined with one or more other features of the other aspects, as may be desired and advantageous for any given or particular application. The use of the singular "a" or "an" is intended to include the plural "one or more" unless specifically stated otherwise.

The description herein with reference to the figures describes the present disclosure in sufficient detail to enable one skilled in the art to utilize the present disclosure in a variety of applications and devices. It will be readily apparent that various changes and modifications could be made therein without departing from the spirit and scope of the disclosure as defined in the following claims.

I claim:

1. A device for managing a hardware-sequestered machine-state, comprising:

an interface configured to communicate with an external electronic data store; and a processor comprising a hardware-protected execution environment (HPEE), wherein the HPEE comprises a local non-volatile ledger and is configured to:

perform an atomic state-modification of the local non-volatile ledger, the atomic state-modification comprising a transition of a discrete-state data object between an executable state and a non-executable state, wherein the atomic state-modification prevents the discrete-state data object from existing in the executable state and the non-executable state simultaneously;

generate an attestation record comprising a cryptographic attestation of the atomic state-modification; and persist the attestation record within the local non-volatile ledger for asynchronous transmission via the interface;

wherein the attestation record comprises a self-verifying instruction to synchronize the external electronic data store with the atomic state-modification.

2. The device of claim 1, wherein the local non-volatile ledger comprises a hardware-isolated memory partition that is inaccessible to the device's primary operating system, and wherein the atomic state-modification is executed via a direct-to-silicon instruction set.

3. The device of claim 1, wherein the HPEE is configured to transmit the attestation record to a publicly-verifiable state-repository to establish evidence of the atomic state-modification independent of the external electronic data store.

4. The device of claim 1, wherein the HPEE is configured to perform a hardware-level pre-computation check of a local power reserve to ensure sufficient energy is available to complete both the atomic state-modification and the persistence of the attestation record before initiating the transition.

5. The device of claim 1, wherein the HPEE comprises a primary ledger and a shadow ledger, the HPEE being configured to commit the atomic state-modification to the primary ledger while deferring a corresponding modification to the shadow ledger until a cryptographic acknowledgment is verified.

6. The device of claim 1, wherein the HPEE is configured to generate a hardware-signed proof of deletion upon confirming the synchronization of the external electronic data store, ensuring no executable residue of the discrete-state data object remains in the local non-volatile ledger.

7. The device of claim 1, wherein the non-executable state is a temporary sequestered state subject to a hardware-enforced expiration condition, wherein the HPEE is configured to autonomously revert the discrete-state data object to the executable state upon the interface failing to receive a synchronization confirmation within a defined temporal window.

8. The device of claim 1, wherein the HPEE is configured to perform a secondary atomic modification to extinguish the discrete-state data object from the non-executable state, rendering the transition irrevocable upon receipt of a cryptographic proof that the attestation record has been recorded on a publicly-verifiable state-repository.

9. The device of claim 1, wherein the attestation record constitutes a proof of sequestration defining a hardware-verified lock on the discrete-state data object, and wherein the HPEE is configured to generate at least one of a proof of capture upon ingestion of a discrete-state data object from an external source, a proof of synchronization upon verification of a cryptographic acknowledgment from the external electronic data store, and a proof of eviction upon transition of the discrete-state data object to a final non-executable state.

10. The device of claim 1, wherein the HPEE is configured to generate a tamper-attestation record upon detection of a physical hardware-tamper event, the tamper-attestation record comprising a final signed state of the local non-volatile ledger for transmission via the interface.

11. The device of claim 1, wherein the HPEE is configured to generate a joint attestation record comprising a multisig combination of a local hardware signature and a remote hardware signature, enabling a peer-to-peer transition of the discrete-state data object.

12. The device of claim 1, wherein the HPEE is configured to initiate a cross-ledger state-transition in response to a proximate trigger signal from a mobile device, whereby the discrete-state data object is sequestered in the local non-volatile ledger as a bridge-state pending synchronization with a second, logically distinct external electronic data store.

13. The device of claim 12, wherein the bridge-state is maintained autonomously within the HPEE, such that the transition between the external electronic data store and the second external electronic data store is verified by a hardware-root-of-trust without reliance on a centralized oracle or intermediary server.

14. The device of claim 1, wherein the attestation record comprises a deterministic nullifier, the deterministic nullifier comprising a unique cryptographic derivative of the discrete-state data object that, upon commitment to the local non-volatile ledger, renders the discrete-state data object permanently spent.

15. The device of claim 1, wherein the atomic state-modification is a simultaneous state-overwrite that shreds the discrete-state data object and persists the attestation record within the local non-volatile ledger, such that no intermediate state is recoverable.

16. A device for managing a hardware-sequestered machine-state, comprising:

an interface; and a processor comprising a hardware-protected execution environment (HPEE), wherein the HPEE comprises a local non-volatile ledger and is configured to:

ingest a discrete-state data object originating from a first external electronic data store;

execute a hardware-enforced state-transition to move the discrete-state data object into a sequestered non-executable state within the local non-volatile ledger, wherein the hardware-enforced state-transition prevents the discrete-state data object from existing in an executable state and the sequestered non-executable state simultaneously;

generate a hardware-attested record comprising a proof of the sequestered non-executable state; and transmit the hardware-attested record via the interface to authorize a target-state modification within a second external electronic data store.

17. The device of claim 16, wherein the first external electronic data store and the second external electronic data store are technologically heterogeneous, and the HPEE is configured to perform a protocol-translation of the discrete-state data object during the hardware-enforced state-transition.

18. The device of claim 16, wherein the target-state modification in the second external electronic data store is cryptographically contingent upon the verification of the hardware-attested record, such that the second external electronic data store cannot modify its state without receiving the proof of the sequestered non-executable state.

19. The device of claim 16, wherein the sequestered non-executable state within the local non-volatile ledger acts as an atomic buffer, ensuring that the discrete-state data object cannot exist in an executable state in either the first or second external electronic data stores simultaneously.

20. The device of claim 16, wherein the HPEE is configured to perform a hardware-level privacy-masking on the discrete-state data object during the state-transition, such that the hardware-attested record provides proof of the sequestered state to the second external electronic data store without revealing a source-identity from the first external electronic data store.

21. The device of claim 16, wherein the hardware-attested record comprises a unidirectional state-commitment, rendering the sequestration of the discrete-state data object irrevocable within the local non-volatile ledger until a finalization acknowledgment is received from the second external electronic data store.

22. The device of claim 16, wherein the HPEE is configured to generate a reversal-proof and transmit the reversal-proof to the first external electronic data store if the transmission of the hardware-attested record to the second external electronic data store fails to meet a hardware-defined timeout condition.

23. The device of claim 16, wherein the HPEE is configured to generate a tombstone-record and transmit the tombstone-record to the first external electronic data store upon receiving a confirmation of the target-state modification from the second external electronic data store to finalize the hardware-enforced state-transition.

24. A method for managing a hardware-sequestered machine-state, the method comprising:

performing, within a hardware-protected execution environment (HPEE) of a device, an atomic state-modification of a local non-volatile ledger to transition a discrete-state data object from an executable state to a sequestered non-executable state, wherein the atomic state-modification prevents the discrete-state data object from existing in the executable state and the sequestered non-executable state simultaneously;

generating, within the HPEE, a cryptographically signed attestation record confirming the completion of the atomic state-modification, the attestation record being persisted within the local non-volatile ledger; and transmitting, via an interface of the device, the attestation record as an autonomous authorization instruction to at least one external electronic data store, wherein the attestation record is configured to trigger a state-update in the at least one external electronic data store to synchronize with the sequestered non-executable state of the discrete-state data object.

25. The method of claim 24, further comprising initiating, via the HPEE, a cross-ledger state-transition in response to a proximate trigger signal, whereby the discrete-state data object is sequestered in the local non-volatile ledger as a bridge-state pending synchronization with a second, logically distinct external electronic data store.

26. The method of claim 24, further comprising verifying, within the HPEE, a source-attestation received from an external electronic data store prior to the atomic state-modification, the source-attestation confirming that the discrete-state data object has been locked or extinguished within the external electronic data store.

27. The method of claim 24, further comprising maintaining, within the local non-volatile ledger, a cross-store sequence-nonce to prevent a re-ingestion of the discrete-state data object once it has been transitioned to the at least one external electronic data store.

28. The method of claim 24, further comprising executing, within the HPEE, a hardware-verified compliance-check against the discrete-state data object during the atomic state-modification and sequestering, within the local non-volatile ledger, the discrete-state data object in a quarantine-state if the compliance-check fails.

* * * * *